United States Patent
Nishimura

(10) Patent No.: US 6,307,816 B1
(45) Date of Patent: Oct. 23, 2001

(54) MAGNETO-OPTICAL RECORDING MEDIUM, AND INFORMATION REPRODUCING METHOD USING THE MEDIUM

(75) Inventor: Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/045,682

(22) Filed: Mar. 23, 1998

Related U.S. Application Data

(62) Division of application No. 08/391,563, filed on Feb. 21, 1995, now Pat. No. 5,830,589.

(30) Foreign Application Priority Data

| | | |
|---|---|---|
| Feb. 21, 1994 | (JP) | 6-022653 |
| Feb. 21, 1994 | (JP) | 6-022653 |
| Mar. 16, 1994 | (JP) | 6-045594 |

(51) Int. Cl.$^7$ .................................................. G11B 5/66
(52) U.S. Cl. ........................... 369/13; 369/272; 369/283; 369/288
(58) Field of Search ............................. 365/13, 272, 283, 365/288

(56) References Cited

U.S. PATENT DOCUMENTS

| | | |
|---|---|---|
| 5,094,925 | 3/1992 | Ise et al. ................... 428/694 ML |
| 5,168,482 | 12/1992 | Aratani et al. ................... 369/13 |
| 5,241,520 | 8/1993 | Ohta et al. ................... 369/13 |
| 5,265,074 | 11/1993 | Ohta et al. ................... 369/13 |
| 5,278,810 | 1/1994 | Takahashi et al. ................... 369/13 |
| 5,357,494 | 10/1994 | Aratani ................... 369/13 |
| 5,379,275 | 1/1995 | Kaneko et al. ................... 369/13 |
| 5,420,833 | 5/1995 | Tanaka et al. ................... 369/13 |
| 5,428,585 | 6/1995 | Hirokane et al. ................... 369/13 |
| 5,428,586 | 6/1995 | Kobayashi et al. ................... 369/13 |
| 5,452,272 | 9/1995 | Murakami et al. ................... 369/13 |
| 5,656,384 | 8/1997 | Nishimura et al. ........... 428/694 ML |
| 5,830,589 | * 11/1998 | Nishimura ................... 428/694 ML |

FOREIGN PATENT DOCUMENTS

| | | |
|---|---|---|
| 415449 | 3/1991 | (EP) . |
| 509836 A2 | 10/1992 | (EP) . |
| 545722 | 6/1993 | (EP) . |
| 586175 | 3/1994 | (EP) . |
| 604065 | 6/1994 | (EP) . |
| 619577 | 10/1994 | (EP) . |
| 3-93058 | 4/1991 | (JP) . |
| 4-255946 | 9/1992 | (JP) . |

* cited by examiner

Primary Examiner—Leszek Kiliman
(74) Attorney, Agent, or Firm—Fitzpatrick, Cella, Harper & Scinto

(57) ABSTRACT

A magneto-optical recording medium includes a reproducing layer, a recording layer and an intermediate layer provided between the reproducing layer and the recording layer. The reproducing layer is an in-plane magnetization film at least at room temperature, and becomes a perpendicular magnetization film at a temperature between room temperature and the Curie temperature thereof. The recording layer is a perpendicular magnetization film in a temperature range from room temperature to the Curie temperature thereof. The intermediate layer has a larger in-plane magnetic anisotropy at room temperature than the in-plane magnetic anisotropy of the reproducing layer.

4 Claims, 15 Drawing Sheets

FIG. 6A
FIG. 6B
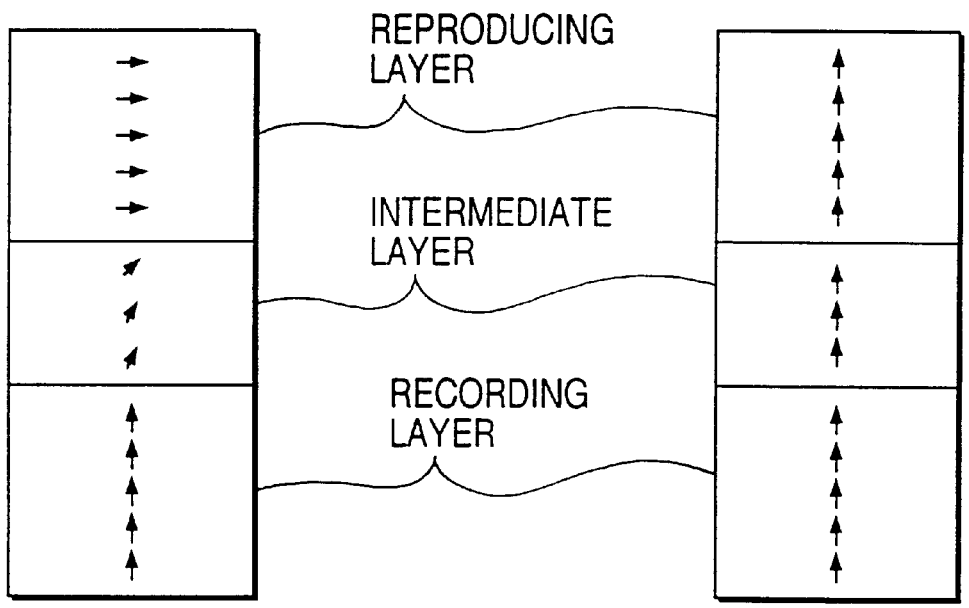
FIG. 7
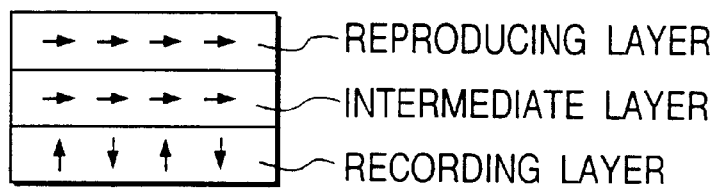

INTERFACE MAGNETIC WALL

MAGNETO-OPTICAL RECORDING MEDIUM, AND INFORMATION REPRODUCING METHOD USING THE MEDIUM

This application is a divisional of application Ser. No. 08/391,563 filed Feb. 21, 1995 now U.S. Pat. No. 5,830,589.

BACKGROUND OF THE INVENTION

1. Field of the Invention

The present invention relates to a magneto-optical recording medium on/from which information is recorded/reproduced by a laser beam by utilizing a magneto-optical effect, and more particularly, to a magneto-optical recording medium which can realize high-density recording, and a magneto-optical reproduction method.

2. Related Background Art

As a rewritable high-density recording method, a magneto-optical recording medium on which information is recorded by writing magnetic domains on a magnetic thin film using heat energy of a semiconductor laser, and from which the information is read out using the magneto-optical effect has received a lot of attention. In recent years, demand has arisen for developing a recording medium of a larger capacity by increasing the recording speed of the magneto-optical recording medium.

The line recording density of an optical disk such as a magneto-optical recording medium largely depends on the laser wavelength of a reproduction optical system and the numerical aperture of an objective lens. More specifically, when the wavelength $\lambda$ of the reproduction optical system and the numerical aperture NA of the objective lens are determined, the diameter of the beam waist is determined. For this reason, the lower limit of a mark period which can be reproduced and detected is about $\lambda/2NA$.

On the other hand, the track density is mainly limited by crosstalk. The crosstalk is mainly determined by the distribution (profile) of a laser beam on the medium surface, and is expressed as a function of $\lambda/2NA$ like the mark period.

Therefore, in order to develop a high density conventional optical disk, the wavelength of a laser of the reproduction optical system must be shortened, and the numerical aperture NA of the objective lens must be increased. However, it is not easy to shorten the wavelength of the laser due to problems associated with the efficiency, heat generation, and the like of the elements thereof. On the other hand, when the numerical aperture of the objective lens is increased, the distance between the lens and the disk becomes too small, and a mechanical problem such as a collision may occur. For these reasons, a technique for increasing the recording density by modifying the arrangement of the recording medium or the reading method has been developed.

For example, in Japanese Laid-Open Patent Application Nos. 3-93058 and 4-255946, attempts have been made to improve the recording density by magnetic super-resolution using a medium comprising a reproducing layer and a recording layer. In this technique, an initialization external magnetic field is applied in advance to a medium, which basically comprises a reproducing layer and a recording layer and also comprises an auxiliary layer and an intermediate layer for the purpose of improving the medium characteristics, by aligning the direction of magnetization of the reproducing layer in one direction before reproduction of a signal. Thereafter, magnetic domain information on the recording layer is masked, and a light spot irradiates the medium. Of temperature distributions formed on the medium in this case, magnetic domain information on the recording layer can be transferred to and reproduced by only a reproducing layer portion in a high-temperature region. In this manner, intersymbol interference upon reproduction is decreased, and a signal having a period equal to or smaller than the diffraction limit of light can be reproduced, thereby improving the recording density.

However, since the super-resolution method described in Japanese Laid-Open Patent Application No. 3-93058 requires a large initialization magnet and a reproducing magnetic field for reproduction, the drive device becomes expensive, and a compact structure is difficult to achieve.

In order to solve these problems, the present inventor examined a magneto-optical recording medium which can realize magnetic super-resolution without applying a reproducing magnetic field, and a reproducing method of the magneto-optical recording medium. As shown in FIG. 1, using a medium having a two-layered structure in which a magnetic layer (reproducing layer) whose magnetization is oriented in the in-plane direction at room temperature, and is oriented in the perpendicular direction when the temperature rises, and a magnetic layer (recording layer) having perpendicular magnetic anisotropy are stacked, magnetization information on the recording layer is transferred to only a high-temperature portion, which is irradiated with a light spot and becomes a perpendicular magnetization film, of the reproducing layer upon reproduction, thereby realizing magnetic super-resolution without applying any reproducing magnetic field. This method does not require an operation for aligning the direction of magnetization of the reproducing layer in one direction in advance, and the like, and can reproduce a signal having a period equal to or smaller than the diffraction limit of light.

However, in such a two-layered super-resolution magneto-optical recording medium using an in-plane magnetization film, when in-plane anisotropy is increased at room temperature, magnetization information on the recording layer can be sufficiently masked, but it is difficult to convert this film into a perfect perpendicular magnetization film at the reproducing temperature. For example, when an RE (rare earth) rich heavy rare earth-iron group transition metal alloy is used in the reproducing layer, if the Co addition amount is increased not to decrease the Curie temperature and the content of a rare earth element is increased to increase Ms at room temperature and to increase in-plane anisotropy, the compensation temperature increases accordingly, and Ms cannot become sufficiently small at the reproducing temperature. As a result, a perfect perpendicular magnetization film cannot be obtained at the reproducing temperature.

On the contrary, when in-plane anisotropy at room temperature is decreased, a perfect perpendicular magnetization film can be obtained at the reproducing temperature, but an interface magnetic wall formed between the reproducing layer and the recording layer at room temperature is mainly formed at the reproducing layer side, as shown in FIG. 2. More specifically, a magnetization component in the perpendicular direction conforming to the magnetization information on the recording layer is formed in a portion, near the recording layer, of the reproducing layer. Therefore, it is difficult to perfectly mask the magnetization information on the recording layer by the reproducing layer.

Therefore, in the above-mentioned two-layered super-resolution magneto-optical recording medium using an in-plane magnetization film, when the recording mark length or track width is shortened, it is not easy to obtain a satisfactory reproducing signal.

SUMMARY OF THE INVENTION

It is, therefore, an object of the present invention to improve the above-mentioned in-plane or longitudinal magnetization film type super-resolution medium in consideration of the above situation, and to attain further improvements of the medium characteristics such as improvements of the line recording density and the track density by perfectly masking magnetization information on the recording layer in a temperature range from room temperature to a temperature lower than that of a high-temperature portion in a reproducing beam spot, and sufficiently reproducing recorded information in the high-temperature portion of the spot.

In order to achieve the above object, there is provided a magneto-optical recording medium comprising:

a reproducing layer which is an in-plane magnetization film at least at room temperature, and becomes a perpendicular magnetization film at a temperature between room temperature and a Curie temperature thereof;

a recording layer which is a perpendicular magnetization film in a temperature range from room temperature to a Curie temperature thereof; and an intermediate layer which is arranged between the reproducing layer and the recording layer, and has a larger in-plane magnetic anisotropy at room temperature than an in-plane magnetic anisotropy of the reproducing layer.

There is also provided an information reproducing method for reproducing information accumulated on a recording layer of a magneto-optical recording medium, which comprises:

a reproducing layer which is an in-plane magnetization film at least at room temperature, and becomes a perpendicular magnetization film at a temperature between room temperature and a Curie temperature thereof;

a recording layer which is a perpendicular magnetization film in a temperature range from room temperature to a Curie temperature thereof; and an intermediate layer which is arranged between the reproducing layer and the recording layer, and has a larger in-plane magnetic anisotropy at room temperature than an in-plane magnetic anisotropy of the reproducing layer, the method comprising the steps of:

irradiating a light beam spot from the reproducing layer side;

converting a magnetization in a partial region, in the light beam spot irradiated region, on the reproducing layer into a perpendicular magnetization film;

transferring information accumulated on the recording layer to the partial region, which has become a perpendicular magnetization film, of the reproducing layer; and reproducing the information by detecting light reflected by the medium.

BRIEF DESCRIPTION OF THE DRAWINGS

FIGS. 6A and 6B are views showing the states of the directions of magnetization of the magneto-optical recording medium according to the first embodiment of the present invention, in which FIG. 6A is a view showing the state in a range from room temperature to the reproducing temperature, and FIG. 6B is a view showing the state at the reproducing temperature;

FIG. 7 is a sectional view showing an example of the state of the directions of magnetization at room temperature after recording is performed on a recording layer of the magneto-optical recording medium according to the first embodiment of the present invention;

FIGS. 8A to 8C are views showing an example of a reproducing method of the magneto-optical recording medium according to the first embodiment of the present invention, in which FIG. 8A is a view showing a mask region and an aperture region in a light spot on the medium surface, FIG. 8B is a view showing the state of the directions of magnetization of the respective layers, FIG. 8C is a graph showing the temperature distribution in the track direction;

FIGS. 10A to 10C are views showing another example of the reproducing method of the magneto-optical recording medium according to the first embodiment of the present invention, in which FIG. 10A is a view showing a mask region and an aperture region in a light spot on the medium surface, FIG. 10B is a view showing the state of the directions of magnetization of the respective layers, FIG. 10C is a graph showing the temperature distribution in the track direction;

DETAILED DESCRIPTION OF THE PREFERRED EMBODIMENTS (First Embodiment)

Figure 1:
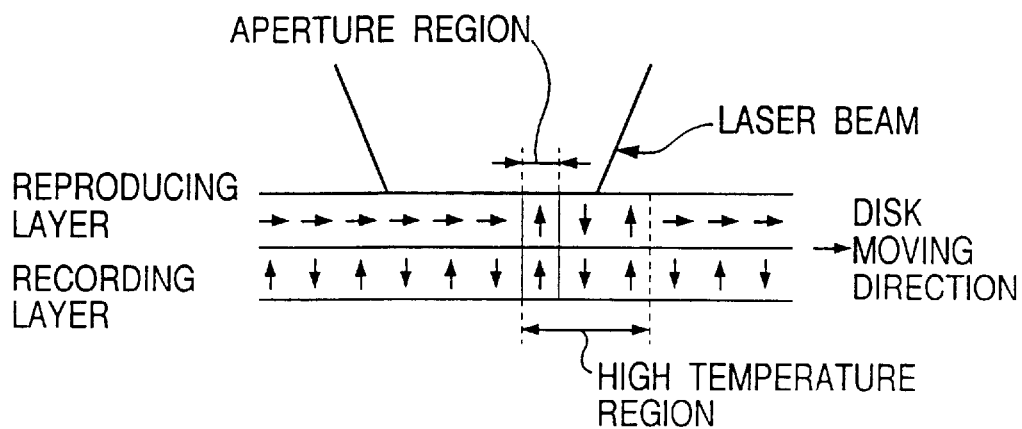
FIG. 1 is a schematic view showing the magnetic super-resolution effect of a two-layered magneto-optical recording medium using an in-plane magnetization film.
Figure 2:
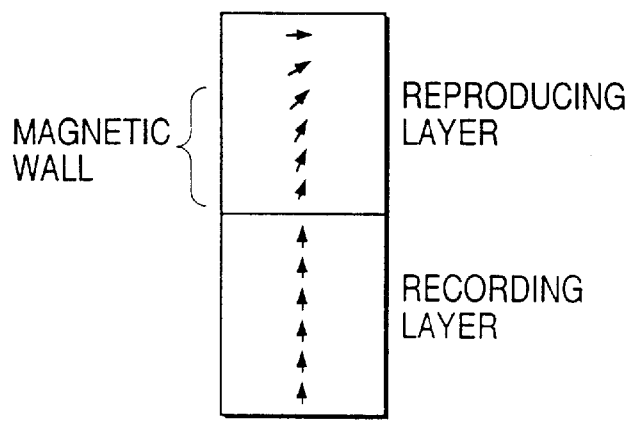
FIG. 2 is a view showing in detail the directions of magnetization of the recording medium shown in FIG. 1.
Figure 3:
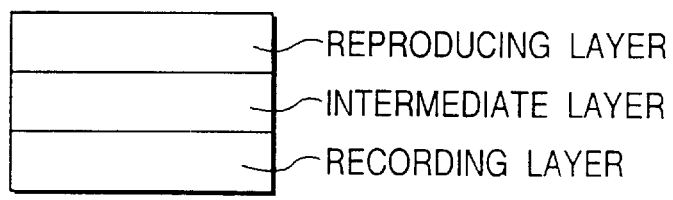
FIG. 3 is a sectional view showing the basic structure of magnetic layers of a magneto-optical recording medium according to the first embodiment of the present invention.

A magneto-optical recording medium and an information recording/reproducing method using the medium according to the first embodiment of the present invention will be described in detail below with reference to the accompanying drawings. For the sake of simplicity, a first magnetic layer will be referred to as a reproducing layer hereinafter, a second magnetic layer will be referred to as a recording layer hereinafter, and a third magnetic layer will be referred to as an intermediate layer hereinafter. Therefore, the basic structure of the magnetic layers of the magneto-optical recording medium of the present invention is realized by stacking the reproducing layer, the intermediate layer, and the recording layer, as shown in FIG. 3.

As the material of the reproducing layer, a rare earth-iron group amorphous alloy such as GdFeCo, GdCo, GdTbFeCo, GdDyFeCo, or the like is preferable. In order to obtain a sufficient magneto-optical effect upon reproduction, the reproducing layer is required to have a high Curie temperature, and preferably has a Curie temperature of 250° C. and, more preferably, 300° C. or higher. In order to improve the reproduction output for short-wavelength light, and so on, a light rare earth element such as Nd, Sm, Pr, or the like may be added.

As the material of the intermediate layer, a rare earth-iron group amorphous alloy such as GdFeCo, GdCo, GdTbFeCo, GdDyFeCo, or the like is preferable. The Curie temperature of the intermediate layer is equal to or higher than room temperature, and preferably falls within a range from 100° C. to 250° C. and, more preferably, within a range from 130° C. to 210° C.

As the recording layer, a film which has large perpendicular magnetic anisotropy and can stably hold a magnetization state, e.g., a rare earth-iron group amorphous alloy film consisting of, e.g., TbFeCo, DyFeCo, TbDyFeCo, or the like; a garnet film; a platinum group-iron group periodic structure film such as Pt/Co, Pd/Co, or the like; a platinum group-iron group alloy film consisting of, e.g., PtCo, PdCo, or the like; or the like is preferable.

The recording layer is required to allow recording with a laser power as low as possible, and to stably hold a recorded magnetic domain at room temperature and the reproducing temperature, as minimum requirements. For this purpose, the recording layer preferably has a large perpendicular magnetic anisotropy and a low Curie temperature. However, the Curie temperature must be set to be equal to or higher than the reproducing temperature.

Figure 4:
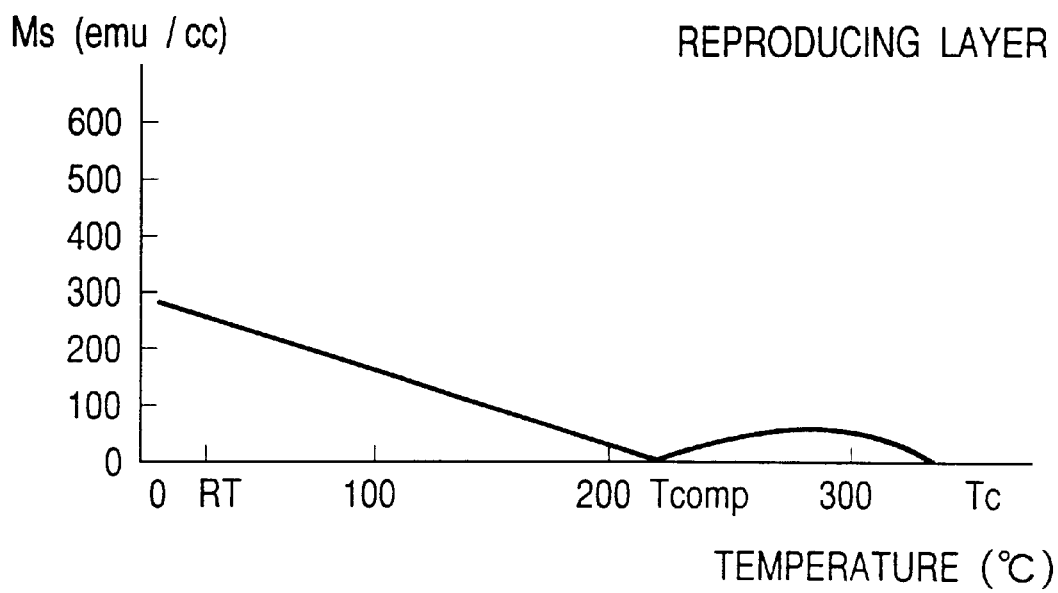
FIG. 4 is a graph showing the temperature characteristics of Ms of a reproducing layer of the magneto-optical recording medium according to the first embodiment of the present invention.

The reproducing layer is required to be an in-plane magnetization film at room temperature and to be a perpendicular magnetization film at high temperatures. For this purpose, a reproducing layer, which consists of a ferrimagnetic heavy rare earth-iron group transition metal alloy, has a compensation temperature between room temperature and its Curie temperature, has a large Ms at room temperature and a small Ms at the reproducing temperature, as shown in FIG. 4, may be used. When the reproducing layer consists of GdFeCo, the Gd content preferably falls within a range from 22 to 38%, and more preferably, within a range from 25 to 35%.

More specifically, when the saturation magnetization of a magnetic thin film is represented by Ms and the perpendicular magnetic anisotropy energy is represented by Ku, it is generally known that the principal direction of magnetization is determined by the effective perpendicular magnetic anisotropy constant $K\perp$ defined by equation I below. When $K\perp$ is positive, the magnetic thin film becomes a perpendicular magnetization film; when $K\perp$ is negative, the magnetic thin film becomes an in-plane magnetization film, and the absolute value of $K\perp$ represents the strength of anisotropy. In other words, for example, a large in-plane anisotropy means that $K\perp$ assumes a negative value, and its absolute value is large.

$$K\perp = Ku - 2\pi Ms^2 \qquad (I)$$

Figure 5:
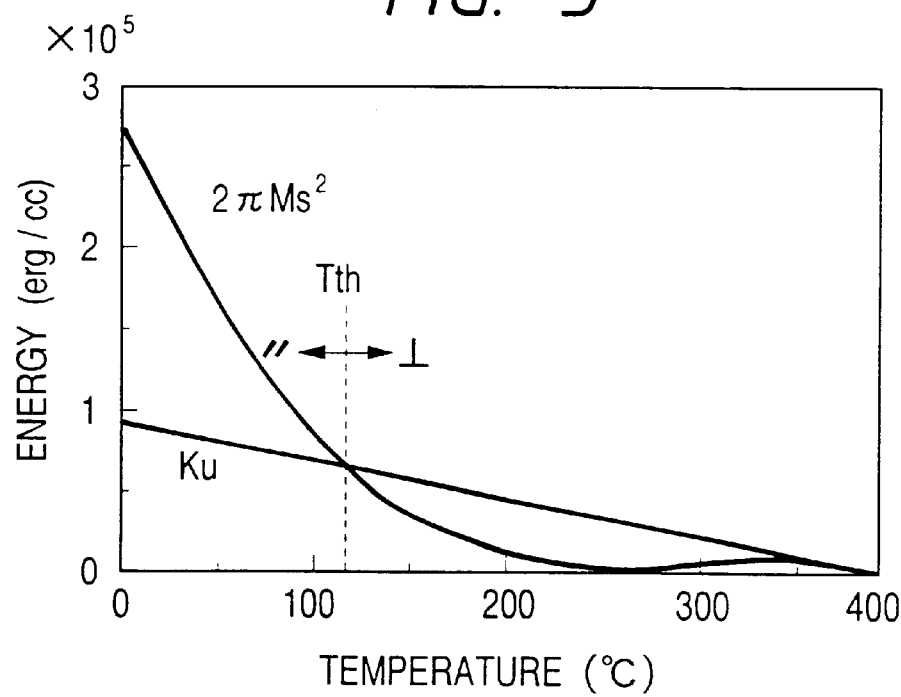
FIG. 5 is a graph showing an example of the relationship between the demagnetizing field energy $2\pi Ms^2$ and the perpendicular magnetic anisotropy energy Ku of the reproducing layer of the magneto-optical recording medium according to the first embodiment of the present invention.

As shown in FIG. 5, since the reproducing layer has a large Ms in a low-temperature portion having a temperature equal to or lower than Tth, $K\perp$ is negative, and this reproducing layer portion is an in-plane magnetization film. However, upon reproduction, since the temperature rises, Ms decreases. As a result, $2\pi Ms^2$ decreases abruptly, and the relationship between $2\pi Ms^2$ and the perpendicular magnetic anisotropy energy Ku is reversed (the reversing temperature is represented by Tr). Then, $K\perp$ assumes a positive value, and the corresponding reproducing layer portion becomes a perpendicular magnetization film. As the difference between the compensation temperature and the Curie temperature becomes larger, the change amount of $K\perp$ becomes larger, and transition of the direction of magnetization from the in-plane direction to the perpendicular direction can be attained more quickly.

The above-mentioned energy Ku apparently changes when another magnetic film is stacked on the magnetic thin film of interest. This is because a magnetic coupling force such as an exchange coupling force, magnetostatic coupling force, or the like acts from the other stacked magnetic layer. For example, when a perpendicular magnetization film is stacked on the magnetic thin film of interest, Ku apparently increases; when an in-plane magnetization film is stacked, Ku apparently decreases.

In the magneto-optical recording medium of the present invention, the intermediate layer is arranged between the reproducing layer and the recording layer. The intermediate layer is an in-plane magnetization film which has a larger in-plane magnetic anisotropy than that of the reproducing layer at room temperature, and is a magnetic film which has perpendicular magnetic anisotropy or a small in-plane magnetic anisotropy at the reproducing temperature.

For this reason, the apparent Ku of the reproducing layer decreases at room temperature. In addition, as shown in FIG.

6A, since most of an interface magnetic wall formed between the reproducing layer and the recording layer is formed on the intermediate layer, the reproducing layer can stably become an in-plane magnetization film. Therefore, the reproducing layer can perfectly mask magnetization information on the recording layer. On the other hand, at the reproducing temperature, as shown in FIG. 6B, the reproducing layer stably becomes a perpendicular magnetization film, and can sufficiently reproduce magnetization information on the recording layer.

The in-plane anisotropy, at room temperature, of the intermediate layer is larger than that, at room temperature, of the reproducing layer. In order to increase the in-plane anisotropy, for example, Ms at room temperature can be increased. In addition, the perpendicular anisotropy energy Ku may be decreased or may be controlled to assume a negative value (to have in-plane anisotropy) by, e.g., adding an element such as Co for improving in-plane anisotropy. When the intermediate layer consists of GdFe as a major component, the Gd content preferably falls within a range from 35 to 50% and, more preferably, a range from 40 to 47%.

Since the intermediate layer need not contribute to the magneto-optical effect, the reproducing characteristics do not deteriorate even when the Curie temperature of the intermediate layer is set to be low. Therefore, in order to increase the perpendicular magnetic anisotropy, at the reproducing temperature, of the intermediate layer, for example, the Curie temperature of the intermediate layer may be set to be lower than that of the reproducing layer, so that Ms sufficiently becomes small at the reproducing temperature. The Curie temperature can be lowered by adding a nonmagnetic element such as Al, Si, Cu, or the like, or by decreasing the Co content.

Even when the intermediate layer itself has no perpendicular magnetic anisotropy at the reproducing temperature, the intermediate layer can be provided with perpendicular magnetic anisotropy by the magnetic coupling forces from the recording layer and the reproducing layer which has perpendicular magnetic anisotropy, and magnetization information on the recording layer can be transferred to the reproducing layer.

The film thickness of the intermediate layer can be equal to or larger than that of a magnetic wall portion formed between the reproducing layer which is an in-plane magnetization film in a temperature range from room temperature to a temperature lower than the reproducing temperature, and the recording layer which is a perpendicular magnetization film. On the other hand, when the film thickness of the intermediate layer is too large, the total thickness of the magnetic layers becomes large, and high recording power is undesirably required. Therefore, the film thickness of the intermediate layer preferably falls within a range from 20 Å to 200 Å and, more preferably, a range from 50 Å to 150 Å.

In the magneto-optical recording medium of the present invention, since the intermediate layer with the above-mentioned characteristics is provided, the direction of magnetization of the reproducing layer can be easily aligned in the in-plane direction at room temperature as compared to a case wherein the reproducing layer is directly stacked on the recording layer.

Assume that the Curie temperatures of the reproducing layer, the intermediate layer, and the recording layer are respectively represented by $Tc_1$, $Tc_3$, and $Tc_2$, the compensation temperature of the reproducing layer is represented by $T_{comp1}$, the saturation magnetizations of the reproducing layer, intermediate layer, and recording layer are respectively represented by $Ms_1$, $Ms_3$, and $Ms_2$, the effective perpendicular magnetic anisotropy constants of the reproducing layer, the intermediate layer, and the recording layer are respectively represented by $K\perp_1$, $K\perp_3$, and $K\perp_2$, and the perpendicular magnetic anisotropy energies of the reproducing layer, the intermediate layer, and the recording layer are respectively represented by $Ku_1$, $Ku_3$, and $Ku_2$. From equation I above, $K\perp_i$ (i=1, 2, or 3) is expressed by the following equation II:

$$K\perp_i = Ku_i - 2\pi Ms_i^2 \qquad (II)$$

The magneto-optical recording medium of the present invention satisfies the following inequality III at room temperature:

$$K\perp_3 < K\perp_1 << K\perp_2 \qquad (III)$$

As conditions for satisfying such a relation, for example, the following inequalities IV and V must be satisfied at room temperature:

$$Ms_1 < Ms_3 \qquad (IV)$$

$$Ms_2 < Ms_3 \qquad (V)$$

The Curie temperatures must satisfy the following inequality VI:

$$RT \text{ (room temperature)} < Tc_3 << Tc_1 \qquad (VI)$$

Note that the magneto-optical recording medium of the present invention basically has a three-layered magnetic film structure. For the purpose of further improving the characteristics and productivity of the medium, other magnetic layers may be arranged. In order to improve the interference effect and protection performance, a dielectric layer and a metal layer may be arranged. In order to improve thermal conductivity, a metal thermal conductor layer may be arranged.

By adding a small amount of element such as Cr, Ti, Ta, or the like to the respective magnetic layers, the corrosion resistance may be increased.

The principle of a reproducing process according to the present invention will be described below.

A data signal is recorded on the recording layer of the magneto-optical recording medium of the present invention, as shown in FIG. 7. Recording is attained by modulating an external magnetic field while applying a laser beam with a power which can increase the temperature of a recording layer portion to a temperature near its Curie temperature, or an overwrite operation is performed by modulating a laser power while applying a magnetic field in the recording direction after the direction of magnetization is erased by alignment in one direction using an initialization layer or an initialization magnetic field.

In this case, when the intensity of the laser beam is determined in consideration of the linear velocity of the recording medium, so that only a predetermined region in a light spot has a temperature near the Curie temperature of the recording layer, a recorded magnetic domain equal to or smaller than the diameter of the light spot can be formed, and as a result, a signal having a period equal to or smaller than the diffraction limit of light can be recorded.

Upon reproduction of data, a reproducing laser beam continuously irradiates onto the medium, and light reflected by the medium is detected. At this time, the temperature of the laser irradiated portion rises, and the temperature distribution on the medium extends in the moving direction of the medium and includes a high-temperature portion in a portion in the light spot.

Figure 8A:
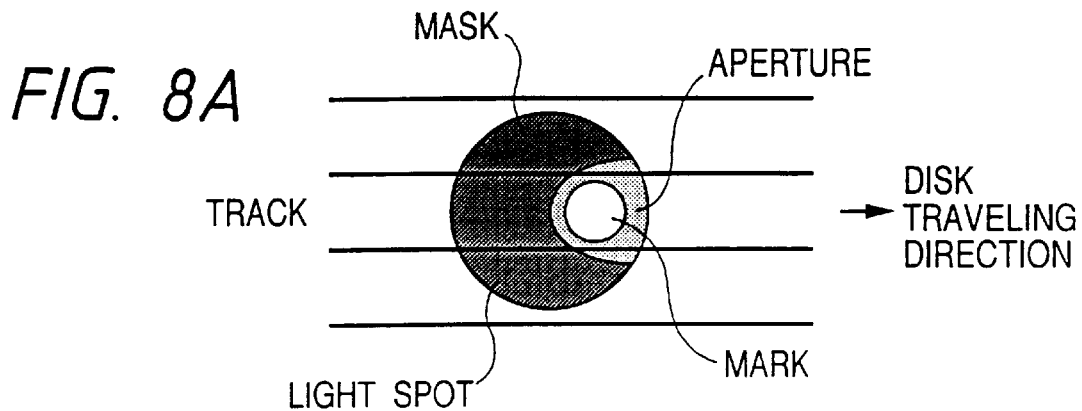
Figure 8B:
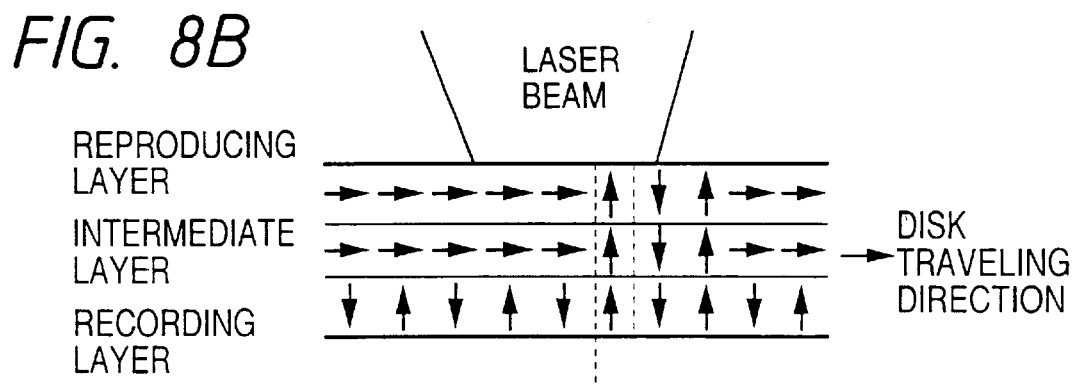
Figure 8C:
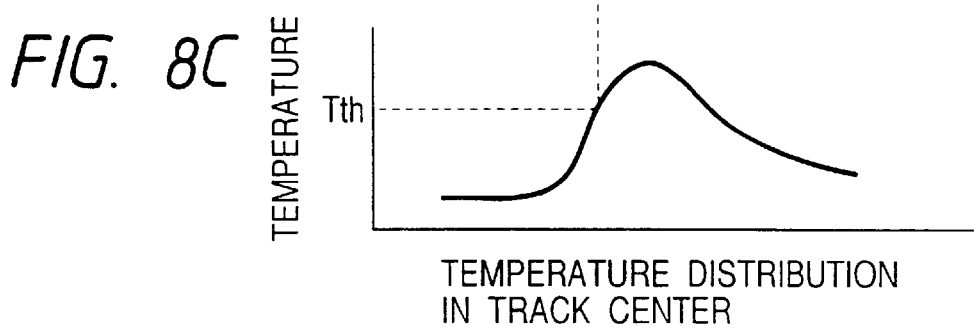

More specifically, when the intensity of the reproducing laser beam is set so that the temperature of the portion in the light spot shown in FIG. 8C becomes equal to or higher than the temperature Tth at which the portion makes the transition from an in-plane magnetization film to a perpendicular magnetization film, the reproducing and recording layer portions corresponding to the portion in the light spot can become a perpendicular magnetization film (aperture region), as shown in FIG. 8B, and the remaining portion can remain to be an in-plane magnetization film (mask region). Since most of the interface magnetic wall formed between the reproducing layer and the recording layer is formed in the intermediate layer, the reproducing layer portion stably becomes an in-plane magnetization film. Since the reproducing layer portion which has become a perpendicular magnetization film is magnetically coupled by exchange coupling to the recording layer portion via the intermediate layer, a signal (information) on the recording layer portion is transferred to the reproducing layer portion. The transferred magnetic signal is converted into an optical signal by the magneto-optical effect (Kerr rotation angle or Faraday rotation angle) of the reproducing layer, and the optical signal is detected. More specifically, the information is reproduced by detecting reflected light.

In this manner, in consideration of the fact that the area of the high-temperature portion of the light spot shown in FIG. 8A can be determined by the setting intensity of the laser beam, a signal recorded on the recording layer and having a period equal to or smaller than the diffraction limit of light can be transferred to the reproducing layer in units of recorded marks, and as a result, the signal having the period equal to or smaller than the diffraction limit of light can be reproduced without any intersymbol interference.

Figure 9:
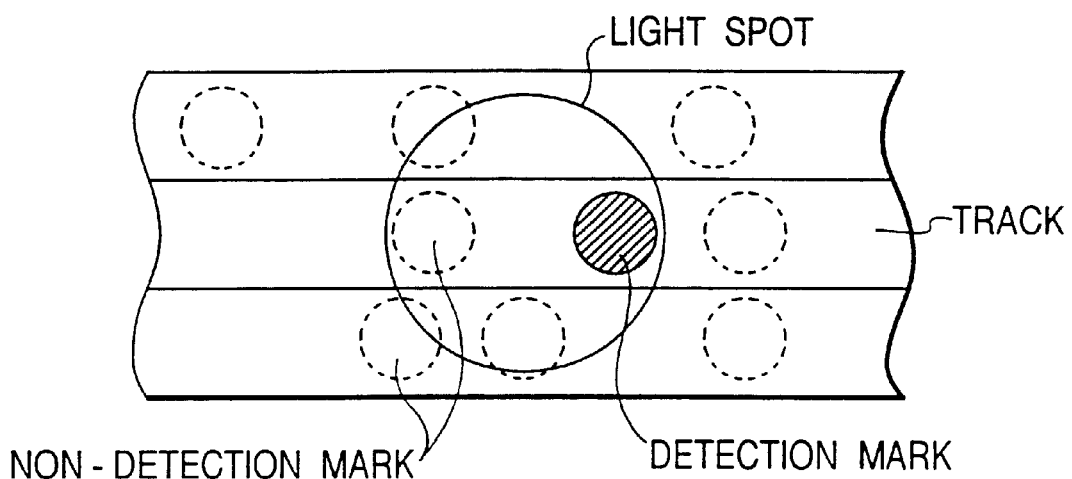
FIG. 9 is a view showing the mark detection state upon reproduction of the magneto-optical recording medium according to the first embodiment of the present invention.

Furthermore, when the temperature distribution is selected such that a temperature Tt at a boundary between a reproducing track and its neighboring track satisfies Tt<Tth, a signal recorded on the recording layer portion of the neighboring track can be prevented from being transferred to the reproducing layer portion, and crosstalk can be eliminated, thus improving the track density. FIG. 9 shows this state.

In the above description, the reproducing layer and the recording layer are magnetically coupled to each other by the exchange interaction. Alternatively, the recording layer and the reproducing layer may be magnetically coupled to each other by magnetostatic coupling upon reproduction.

Figure 10A:
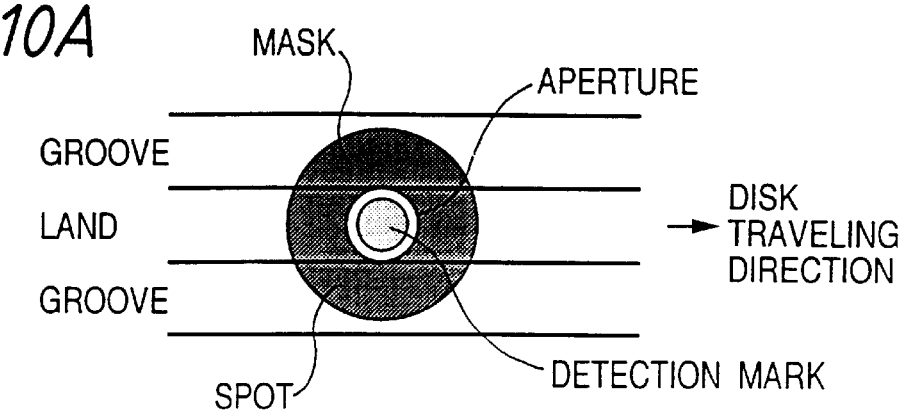
Figure 10B:
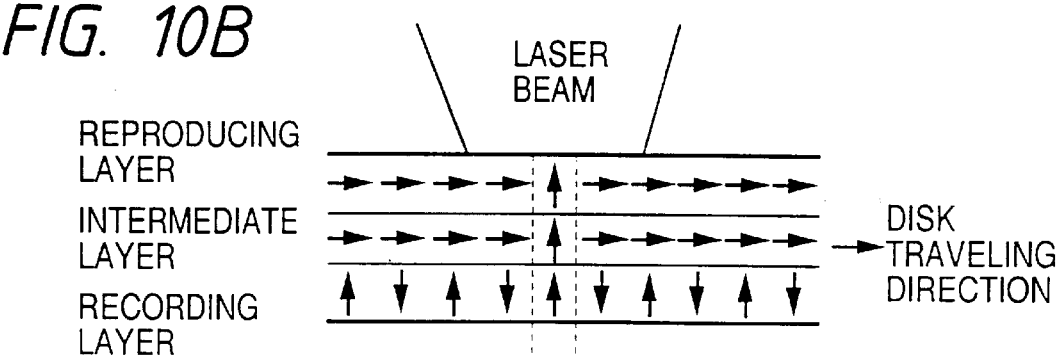
Figure 10C:
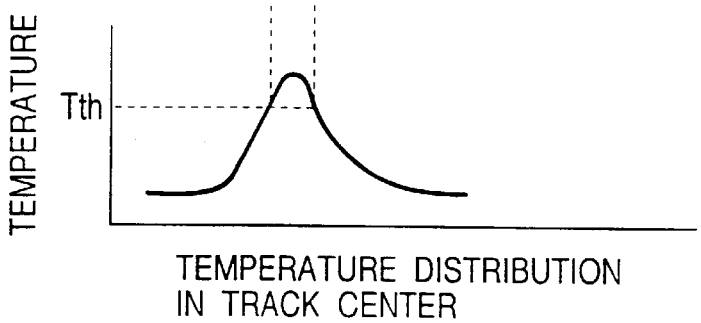

When the thermal conductivity of the medium is relatively large, the center of the temperature profile approaches the center of the light spot, and a portion near the center of the light spot becomes an aperture region, as shown in FIG. 10A. In this case, crosstalk from a neighboring track can be similarly eliminated.

The present invention will be described in detail below by way of its experimental examples. However, the present invention is not limited to these experimental examples.

EXPERIMENTAL EXAMPLE 1

Si, Gd, Tb, Fe, and Co targets were attached to a DC magnetron sputtering apparatus, and a glass substrate having a diameter of 130 mm and a polycarbonate substrate with pregrooves were fixed to a substrate holder arranged at a position separated from the targets by a distance of 150 mm. Thereafter, the interior of a chamber was evacuated by a cryopump to a high vacuum of $1 \times 10^{-5}$ Pa or less.

Figure 11:
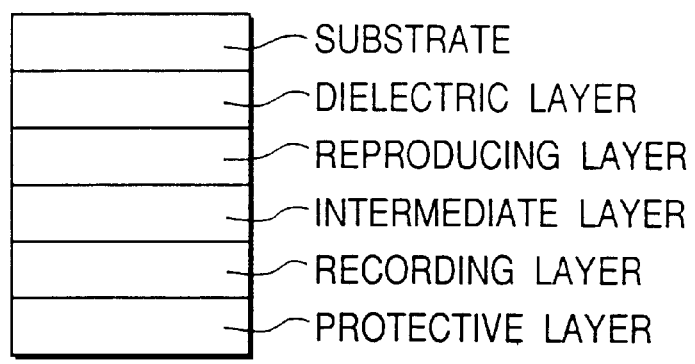
FIG. 11 is a sectional view showing the layer structure of a magneto-optical recording medium in each of Experimental Examples 1 to 4.

During the vacuum evacuation, Ar gas was supplied into the chamber to 0.4 Pa, and thereafter, a 900-Å thick SiN dielectric layer, a 400-Å thick GdFeCo reproducing layer, a 100-Å thick GdFe intermediate layer, a 300-Å TbFeCo recording layer, and a 700-Å thick SiN protective layer were formed in the order named to obtain a sample with the arrangement shown in FIG. 11. Upon formation of each SiN layer, $N_2$ gas was supplied in addition to Ar gas, and the film was formed by DC reactive sputtering. In this case, the mixing ratio of the Ar gas and $N_2$ gas was adjusted to obtain a refractive index of 2.1.

The composition of the GdFeCo reproducing layer was selected to be RE rich at room temperature, and to have a saturation magnetization Ms of 160 emu/cc, a compensation temperature of 205° C., and a Curie temperature of 300° C. or higher.

The composition of the GdFe intermediate layer was selected to be TM rich at room temperature, and to have Ms of 450 emu/cc and a Curie temperature of 205° C.

The composition of the TbFeCo recording layer was selected to be TM rich at room temperature, and to have a saturation magnetization Ms of 200 emu/cc and a Curie temperature of 220° C.

Figure 12:
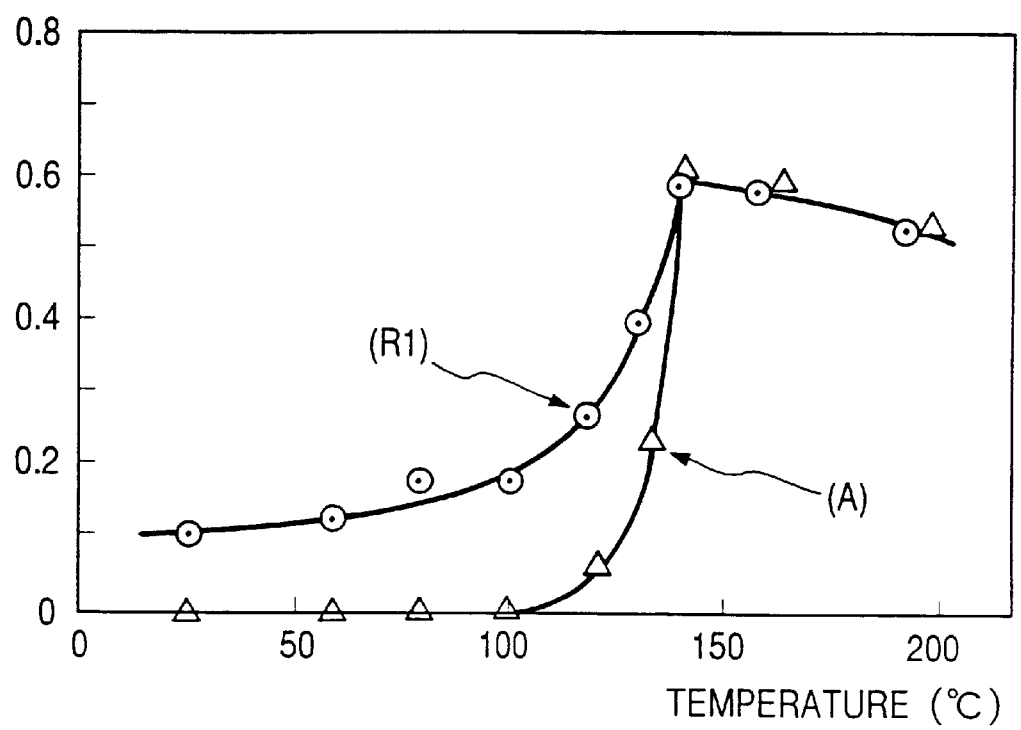
FIG. 12 is a graph showing the temperature dependence of the residual Kerr rotation angle ($\theta_K$) in Experimental Example 1 and Comparative Experimental Example 1.

A semiconductor laser beam of 830 nm was irradiated onto the sample which was formed on the glass substrate, as described above, from the glass substrate side, and the external magnetic field dependence of the Kerr rotation angle ($\theta_K$) was measured. The measurement was performed by heating the sample from room temperature to about 200° C. The temperature dependence of the Kerr rotation angle (residual Kerr rotation angle; $\theta_K^R$) obtained when the external magnetic field was zero is represented by a curve (A) in the graph of FIG. 12. As can be seen from FIG. 12, $\theta_K^R$ is zero within a temperature range from room temperature to about 140° C., and thereafter, $\theta_K^R$ abruptly increases.

The recording/reproduction characteristics were then measured using this magneto-optical recording medium. In an evaluation apparatus, the N.A. of an objective lens was set to be 0.55, the laser wavelength was set to be 780 nm, the recording power fell within the range from 7 to 13 mW, and the reproducing power fell within a range from 2.5 to 3.5 mW, so as to obtain the highest C/N ratio. The linear velocity was set to be 9 m/s.

A carrier signal of 5 to 15 MHz was recorded on the recording layer, and the recording mark dependence of the C/N ratio was checked. Then, crosstalk was measured. The crosstalk was expressed as a difference between a reproducing signal obtained from a land portion on which a signal with a mark length of 1.6 µm was recorded, and a reproducing signal obtained from a neighboring groove portion. Table 1 shows the measurement results.

EXPERIMENTAL EXAMPLE 2

Using the same apparatus and method as in Experimental Example 1, a 900-Å thick SiN dielectric layer, a 400-Å thick GdFeCo reproducing layer, a 120-Å thick GdFe intermediate layer, a 300-Å TbFeCo recording layer, and a 700-Å thick SiN protective layer were formed on a polycarbonate substrate in the order named to obtain a sample with the arrangement shown in FIG. 11.

The composition of the GdFeCo reproducing layer was selected to be RE rich at room temperature, and to have a saturation magnetization Ms of 180 emu/cc, a compensation temperature of 220° C., and a Curie temperature of 300° C. or higher.

The composition of the GdFe intermediate layer was selected to be RE rich at room temperature, and to have Ms of 390 emu/cc and a Curie temperature of 210° C.

The composition of the TbFeCo recording layer was selected to be TM rich at room temperature, and to have a saturation magnetization Ms of 200 emu/cc and a Curie temperature of 220° C.

The recording/reproduction characteristics were evaluated as in Experimental Example 1. Table 1 shows the evaluation results.

EXPERIMENTAL EXAMPLE 3

Using the same apparatus and method as in Experimental Example 1, a 900-Å thick SiN dielectric layer, a 400-Å thick GdFeCo reproducing layer, a 80-Å thick GdFe intermediate layer, a 300-Å TbFeCo recording layer, and a 700-Å thick SiN protective layer were formed on a polycarbonate substrate in the order named to obtain a sample with the arrangement shown in FIG. 11.

The composition of the GdFeCo reproducing layer was selected to be RE rich at room temperature, and to have a saturation magnetization Ms of 130 emu/cc, a compensation temperature of 188° C., and a Curie temperature of 300° C. or higher.

The composition of the GdFe intermediate layer was selected to be RE rich at room temperature, and to have Ms of 540 emu/cc and a Curie temperature of 200° C.

The composition of the TbFeCo recording layer was selected to be TM rich at room temperature, and to have a saturation magnetization Ms of 200 emu/cc and a Curie temperature of 220° C.

The recording/reproduction characteristics were evaluated as in Experimental Example 1. Table 1 shows the evaluation results.

EXPERIMENTAL EXAMPLE 4

Using the same apparatus and method as in Experimental Example 1, a 900-Å thick SiN dielectric layer, a 400-Å thick GdFeCo reproducing layer, a 90-Å thick GdFe intermediate layer, a 300-Å TbFeCo recording layer, and a 700-Å thick SiN protective layer were formed on a polycarbonate substrate in the order named to obtain a sample with the arrangement shown in FIG. 11.

The composition of the GdFeCo reproducing layer was selected to be RE rich at room temperature, and to have a saturation magnetization Ms of 130 emu/cc, a compensation temperature of 188° C., and a Curie temperature of 300° C. or higher.

The composition of the GdFe intermediate layer was selected to be RE rich at room temperature, and to have Ms of 480 emu/cc and a Curie temperature of 215° C.

The composition of the TbFeCo recording layer was selected to be TM rich at room temperature, and to have a saturation magnetization Ms of 200 emu/cc and a Curie temperature of 220° C.

The recording/reproduction characteristics were evaluated as in Experimental Example 1. Table 1 shows the evaluation results.

COMPARATIVE EXPERIMENTAL EXAMPLE 1

Figure 13:
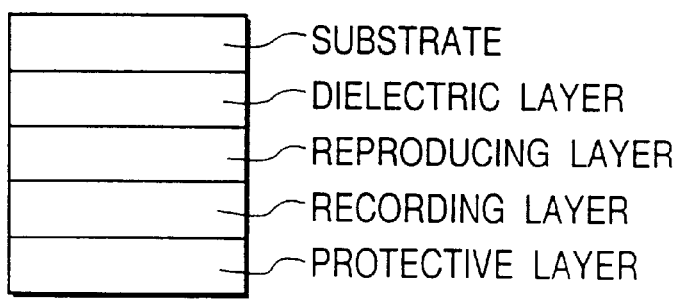
FIG. 13 is a sectional view showing the layer structure of a magneto-optical recording medium in each of Comparative Experimental Examples 1 to 3.

Using the same apparatus and method as in Experimental Example 1, a 900-Å thick SiN dielectric layer, a 400-Å thick GdFeCo reproducing layer, a 400-Å TbFeCo recording layer, and a 700-Å thick SiN protective layer were formed on a glass substrate in the order named to obtain a magneto-optical recording medium with the arrangement shown in FIG. 13. In this case, the refractive index of each SiN layer was selected to be 2.1.

The composition of the GdFeCo reproducing layer was selected to be RE rich at room temperature, and to have a saturation magnetization Ms of 130 emu/cc, a compensation temperature of 188° C., and a Curie temperature of 300° C. or higher.

The composition of the TbFeCo recording layer was selected to be TM rich at room temperature, and to have a saturation magnetization Ms of 200 emu/cc and a Curie temperature of 220° C.

For this magneto-optical recording medium sample, the temperature dependence of the residual Kerr rotation angle $\theta_K^R$ was measured as in Experimental Example 1. The measurement result is represented by a curve (R1) in the graph of FIG. 12.

As can be seen from a comparison between this result and that (curve (A)) of Experimental Example 1, the magneto-optical recording medium of Experimental Example 1 can improve in-plane magnetic anisotropy on a low-temperature portion near room temperature while maintaining a state wherein a perpendicular magnetization film is obtained at high temperatures.

The recording/reproduction characteristics were measured using this magneto-optical recording medium as in Experimental Example 1. Table 1 shows the measurement results.

COMPARATIVE EXPERIMENTAL EXAMPLE 2

Using the same apparatus and method as in Experimental Example 1, a 900-Å thick SiN dielectric layer, a 400-Å thick GdFeCo reproducing layer, a 400-Å TbFeCo recording layer, and a 700-Å thick SiN protective layer were formed on a polycarbonate substrate in the order named to obtain a magneto-optical recording medium. In this case, the refractive index of each SiN layer was selected to be 2.1.

The composition of the GdFeCo reproducing layer was selected to be RE rich at room temperature, and to have a saturation magnetization Ms of 180 emu/cc, a compensation temperature of 220° C., and a Curie temperature of 300° C. or higher.

The composition of the TbFeCo recording layer was selected to be TM rich at room temperature, and to have a saturation magnetization Ms of 200 emu/cc and a Curie temperature of 220° C.

The recording/reproduction characteristics were measured using this magneto-optical recording medium as in Experimental Example 1. Table 1 shows the measurement results.

COMPARATIVE EXPERIMENTAL EXAMPLE 3

Using the same apparatus and method as in Experimental Example 1, a 900-Å thick SiN dielectric layer, a 400-Å thick GdFeCo reproducing layer, a 400-Å TbFeCo recording layer, and a 700-Å thick SiN protective layer were formed on a polycarbonate substrate in the order named to obtain a magneto-optical recording medium. In this case, the refractive index of each SiN layer was selected to be 2.1.

The composition of the GdFeCo reproducing layer was selected to be RE rich at room temperature, and to have a saturation magnetization Ms of 270 emu/cc, a compensation temperature of 280° C., and a Curie temperature of 300° C. or higher.

The composition of the TbFeCo recording layer was selected to be TM rich at room temperature, and to have a saturation magnetization Ms of 200 emu/cc and a Curie temperature of 220° C.

The recording/reproduction characteristics were measured using this magneto-optical recording medium as in Experimental Example 1. Table 1 shows the measurement results.

As can be seen from Table 1, upon comparison between the characteristics of the magneto-optical recording media of the present invention of Experimental Examples 1 to 4, and the characteristics of conventional magneto-optical recording media of Comparative Experimental Examples 1 to 3, the media of the present invention can remarkably improve the C/N ratio and reduce crosstalk for a short mark length.

As described above, when the magneto-optical recording medium and the reproducing method of the present invention are used, a magnetic domain smaller than the beam spot size can be reproduced using a simple apparatus (conventional apparatus) having no initialization magnet, and crosstalk can be eliminated, thus achieving high-density recording with a remarkably improved line recording density and track density.

high temperatures, and an intermediate layer which has a larger in-plane anisotropy at a temperature near room temperature than that of the reproducing layer. Note that the above description expresses the possible states of the respective layers in a state wherein the reproducing layer and the recording layer are stacked.

As the material of the reproducing layer, a rare earth-iron group amorphous alloy, for example, GdCo, GdFeCo, GdTbFeCo, GdDyFeCo, NdGdFeCo, or the like is preferable. The reproducing layer preferably has a small magnetic anisotropy, and has a compensation temperature between room temperature and its Curie temperature.

As the recording layer, a film which has large perpendicular magnetic anisotropy and can stably hold a magnetization state, e.g., a rare earth-iron group amorphous alloy film consisting of, e.g., TbFeCo, DyFeCo, TbDyFeCo, or the like; a garnet film; a platinum group-iron group periodic structure film such as Pt/Co, Pd/Co, or the like; a platinum group-iron group alloy film consisting of, e.g., PtCo, PdCo, or the like; or the like is preferable. An element for improv-

TABLE 1

| | Reproducing Layer | | | | Intermediate Layer | | | |
|---|---|---|---|---|---|---|---|---|
| | Composition | Film Thickness Å | Ms emu/cc | $T_{comp}$ °C. | Tc °C. | Composition | Film Thickness Å | Ms emu/cc | Tc °C. |
| Experimental Example 1 | $Gd_{28}(Fe_{60}Co_{40})_{72}$ | 400 | 160 | 205 | 300< | $Gd_{40}Fe_{60}$ | 100 | 450 | 200 |
| Experimental Example 2 | $Gd_{29}(Fe_{60}Co_{40})_{71}$ | 400 | 180 | 220 | 330< | $Gd_{35}Fe_{65}$ | 120 | 390 | 210 |
| Experimental Example 3 | $Gd_{27}(Fe_{60}Co_{40})_{73}$ | 400 | 130 | 188 | 300< | $Gd_{45}(Fe_{95}Co_5)_{55}$ | 80 | 540 | 200 |
| Experimental Example 4 | $Gd_{29}(Fe_{60}Co_{40})_{71}$ | 400 | 130 | 188 | 300< | $Gd_{40}(Fe_{94}Co_6)_{60}$ | 90 | 480 | 216 |
| Comparative Experimental Example 1 | $Gd_{27}(Fe_{60}Co_{40})_{73}$ | 400 | 130 | 188 | 300< | — | — | — | — |
| Comparative Experimental Example 2 | $Gd_{29}(Fe_{60}Co_{40})_{71}$ | 400 | 180 | 220 | 300< | — | — | — | — |
| Comparative Experimental Example 3 | $Gd_{32}(Fe_{60}Co_{40})_{68}$ | 400 | 270 | 280 | 300< | — | — | — | — |

| | | Recording Layer | | | C/N (dB) | | | |
|---|---|---|---|---|---|---|---|---|
| | | Composition | Film Thickness Å | Ms emu/cc | Tc °C. | 0.78 μm dB | 0.40 μm dB | 0.30 μm dB | Crosstalk dB |
| Experimental Example 1 | | $Tb_{20}(Fe_{80}Co_{20})_{80}$ | 300 | −200 | 220 | 48 | 45 | 36 | −40 |
| Experimental Example 2 | | $Tb_{20}(Fe_{80}Co_{20})_{80}$ | 300 | −200 | 220 | 48 | 44 | 37 | −37 |
| Experimental Example 3 | | $Tb_{20}(Fe_{80}Co_{20})_{80}$ | 300 | −200 | 220 | 48 | 44 | 37 | −36 |
| Experimental Example 4 | | $Tb_{20}(Fe_{80}Co_{20})_{80}$ | 300 | −200 | 220 | 48 | 44 | 38 | −38 |
| Comparative Experimental Example 1 | | $Tb_{20}(Fe_{80}Co_{20})_{80}$ | 300 | −200 | 220 | 48 | 30 | 24 | −29 |
| Comparative Experimental Example 2 | | $Tb_{20}(Fe_{80}Co_{20})_{80}$ | 300 | −200 | 220 | 47 | 35 | 26 | −31 |
| Comparative Experimental Example 3 | | $Tb_{20}(Fe_{80}Co_{20})_{80}$ | 300 | −200 | 220 | 40 | 28 | 17 | −28 |

(Second Embodiment)

A magneto-optical recording medium and a reproducing method using the medium according to the second embodiment of the present invention will be described below with reference to the accompanying drawings. Note that a first magnetic layer will be referred to as a reproducing layer hereinafter, a second magnetic layer will be referred to as a recording layer hereinafter, and a third magnetic layer will be referred to as an intermediate layer hereinafter.

The magneto-optical recording medium of the present invention comprises at least three layers, i.e., a reproducing layer which is an in-plane magnetization film at room temperature, changes to a perpendicular magnetization film when the temperature rises, and then becomes an in-plane magnetization film or loses its magnetization when the temperature further rises, a recording layer which is a perpendicular magnetization film at room temperature and at ing corrosion resistance, such as Cr, Al, Ti, Pt, Nb, or the like may be added to the magnetic layers such as the reproducing layer, the recording layer, and the like.

In addition to the reproducing layer and the recording layer, a dielectric layer consisting of, e.g., $SiN_x$, $AlN_x$, $TaO_x$, $SiO_x$, or the like may be arranged to enhance the interference effect. Also, in order to improve thermal conductivity, a layer consisting of Al, AlTa, AlTi, AlCr, Cu, or the like may be arranged.

Furthermore, an auxiliary layer may be arranged for the purpose of helping recording and reproduction. Moreover, as a protective layer, a dielectric layer or a protective coat consisting a polymer resin may be added.

The recording/reproducing method of the magneto-optical recording medium according to the second embodiment of the present invention will be explained below. However, since the recording method is the same as that in the first embodiment described above, a detailed description thereof will be omitted.

The basic principle of the reproducing method of a magneto-optical recording method in the second embodiment of the present invention will be explained below using a basic two-layered medium comprising a reproducing layer and a recording layer. This principle is also applicable to a case wherein an intermediate layer is arranged, as a matter of course.

In a magnetic thin film as a single layer, when the saturation magnetization is represented by Ms, and the perpendicular magnetic anisotropy constant is represented by Ku, it is generally known that the principal direction of magnetization is determined by the effective perpendicular magnetic anisotropy constant $K\perp$ defined by:

$$K\perp = Ku - 2\pi Ms^2 \qquad (VII)$$

where $2\pi Ms^2$ is the demagnetizing field energy. When $K\perp$ is positive, the magnetic thin film becomes a perpendicular magnetization film; when $K\perp$ is negative, the film becomes an in-plane magnetization film.

Figure 14:
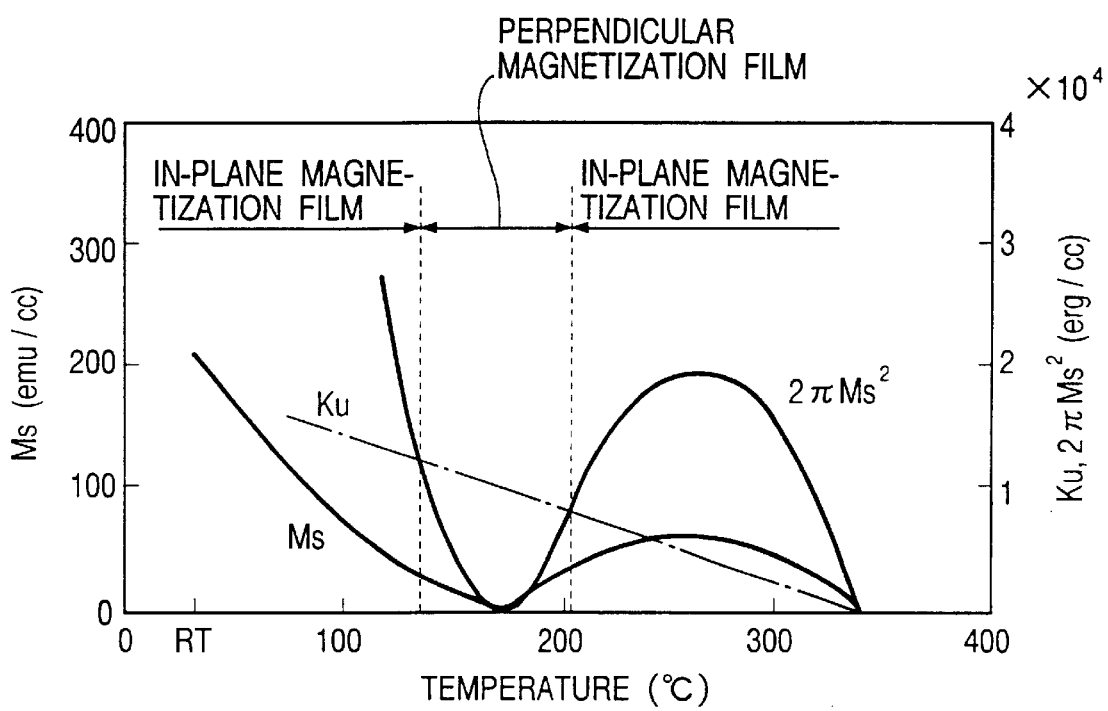
FIG. 14 is a graph showing an example of the temperature dependence of $2\pi Ms^2$ and the perpendicular magnetic anisotropy constant Ku of a reproducing layer in a magneto-optical recording medium according to the second embodiment of the present invention.

When the film has temperature dependences of Ku and Ms, as shown in, e.g., FIG. 14, at room temperature (RT), since the following inequalities (VIII) are satisfied, the film is an in-plane magnetization film:

$$Ku < 2\pi Ms^2, K\perp < 0 \qquad (VIII)$$

However, since the temperature rises upon reproduction, the Ms of the reproducing layer decreases. For this reason, $2\pi Ms^2$ abruptly becomes small, and the relationship between $2\pi Ms^2$ and the perpendicular magnetic anisotropy constant Ku is reversed. As a result, the following inequalities (IX) are satisfied, and the film becomes a perpendicular magnetization film:

$$Ku > 2\pi Ms^2, K\perp > 0 \qquad (IX)$$

When the temperature further rises, the relationship between $2\pi Ms^2$ and Ku is reversed again at temperatures higher than the compensation temperature, and the following inequalities (X) are satisfied again. As a result, the film becomes an in-plane magnetization film.

$$Ku < 2\pi Ms^2, K\perp < 0 \qquad (X)$$

Figure 15:
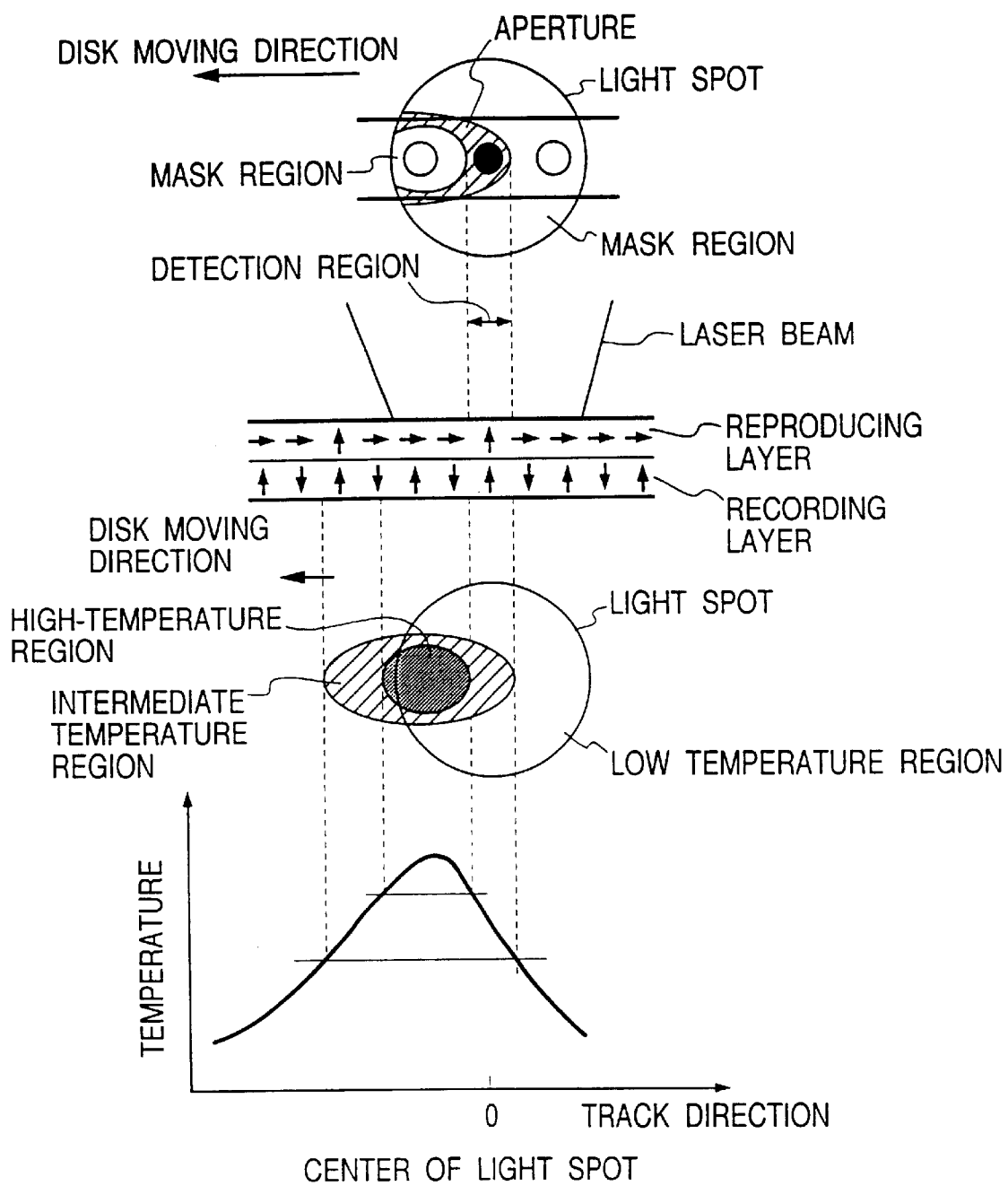
FIG. 15 is an explanatory view showing an example of an information reproducing method in the second embodiment of the present invention.

More specifically, as shown in FIG. 15, a state wherein the magnetization of the reproducing layer in the highest-temperature portion and low-temperature portion as portions of a light spot becomes an in-plane magnetization film, and the magnetization of the reproducing layer in a portion at a middle temperature therebetween is a perpendicular magnetization film is realized. Since the reproducing layer portion as a perpendicular magnetization film is magnetically coupled to the recording layer by exchange coupling, the direction of magnetization of this reproducing layer portion follows a stable direction in relation to the direction of magnetization based on information on the recording layer. More specifically, the information recorded on the recording layer is transferred to the reproducing layer. The transferred information is converted into an optical signal by the magneto-optical effect (in other words, the magneto-optical effect (polar Kerr effect) of a laser beam reflected by the reproducing layer) of the reproducing layer, and the optical signal is detected. That is, the information is reproduced by detecting the reflected light. In this case, no magneto-optical effect (polar Kerr effect) occurs in the reproducing layer portion, corresponding to an in-plane magnetization film, in the light spot.

Therefore, as shown in FIG. 15, a mask region which masks magnetization information on the recording layer, and an aperture region through which the magnetization information is detected are formed in the light spot. Since the aperture region can have an area smaller than that of the light spot, a signal having a period equal to or smaller than the diffraction light of light can be detected, and the line density can be increased.

Since marks on neighboring tracks can also be masked, the density of tracks can also be increased.

In the above description, the reproducing layer and the recording layer are magnetically coupled to each other by exchange interaction. Alternatively, the recording layer and the reproducing layer may be magnetically coupled to each other by magnetostatic coupling upon reproduction. When the reproducing layer and the recording layer are stacked directly or via an intermediate layer, an exchange coupling force, a magnetostatic coupling force, or the like from the perpendicular magnetization film acts, and Ku apparently increases. For this reason, the temperature region which has perpendicular magnetization is shifted toward the low temperature side as compared to a case wherein the layers are not stacked. However, when the perpendicular magnetization temperature region as a single-layered film is set to be relatively high, even when such a film is stacked on a perpendicular magnetization film, a situation that the film becomes an in-plane magnetization film at room temperature and high temperatures, and becomes a perpendicular magnetization film on only a middle temperature region therebetween is established.

A mask may be formed on the highest-temperature portion by causing the magnetization of the reproducing layer to disappear. However, in this case, since the Curie temperature Tc of the reproducing layer must be set to be lower than Tc of the recording layer, the signal strength upon reproduction is slightly lowered.

The intermediate layer in the magneto-optical recording medium according to the second embodiment of the present invention will be explained in more detail below.

The intermediate layer is located between the reproducing layer and the recording layer, and must have a larger in-plane anisotropy than that of the reproducing layer near room temperature. In order to increase in-plane anisotropy, when, for example, a rare earth-iron group alloy is used, a rare earth element dominant composition or an iron element dominant composition can be adopted to increase Ms, at room temperature, of the intermediate layer. Further, it is preferable that the Curie temperature of the intermediate layer is higher than the room temperature and is lower than those of the reproducing layer and the recording layer.

Figure 16A:
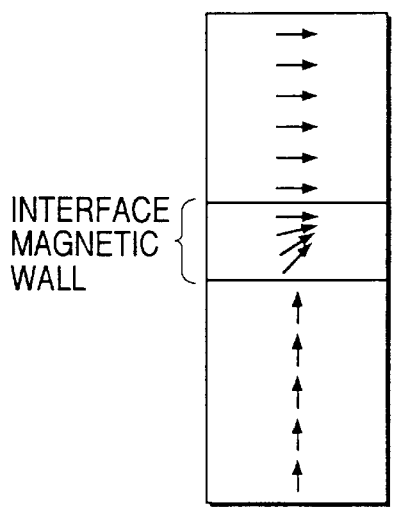
FIGS. 16A and 16B are views showing the magnetization states obtained when an intermediate layer with a large in-plane anisotropy is provided.
Figure 16B:
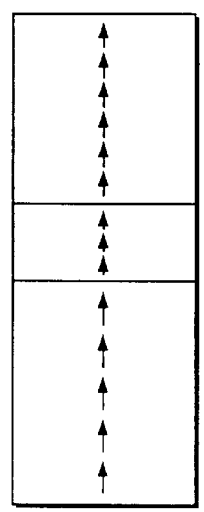

When such an intermediate layer is arranged between the reproducing layer and the recording layer, an interface magnetic wall can be confined in the intermediate layer from room temperature up to an aperture region, as shown in FIGS. 16A and 16B.

Therefore, the reproducing layer can stably be an in-plane magnetization film on a low-temperature region, and can perfectly mask magnetization information on the recording layer.

When the Curie temperature of the intermediate layer is set to be lower than that of the recording layer and to be high so as not to disconnect exchange coupling between the reproducing layer and the recording layer on a middle-temperature region in the light spot, Ms of the intermediate layer can be sufficiently small on the middle-temperature region, thus weakening in-plane anisotropy and strengthening perpendicular magnetic anisotropy. Even when the intermediate layer itself does not have any perpendicular magnetic anisotropy at the reproducing temperature, the intermediate layer can be imparted perpendicular magnetic anisotropy by a magnetic coupling force from the recording layer and the reproducing layer, whose temperature has risen to have perpendicular magnetic anisotropy.

For this reason, on the middle-temperature region, the magnetization on the recording layer is transferred to the reproducing layer. On the high-temperature region, since the temperature of the intermediate layer has reached its Curie temperature, and the exchange coupling force does not act between the recording layer and the reproducing layer, it is easy for the reproducing layer portion to become an in-plane magnetization film.

Figure 17:
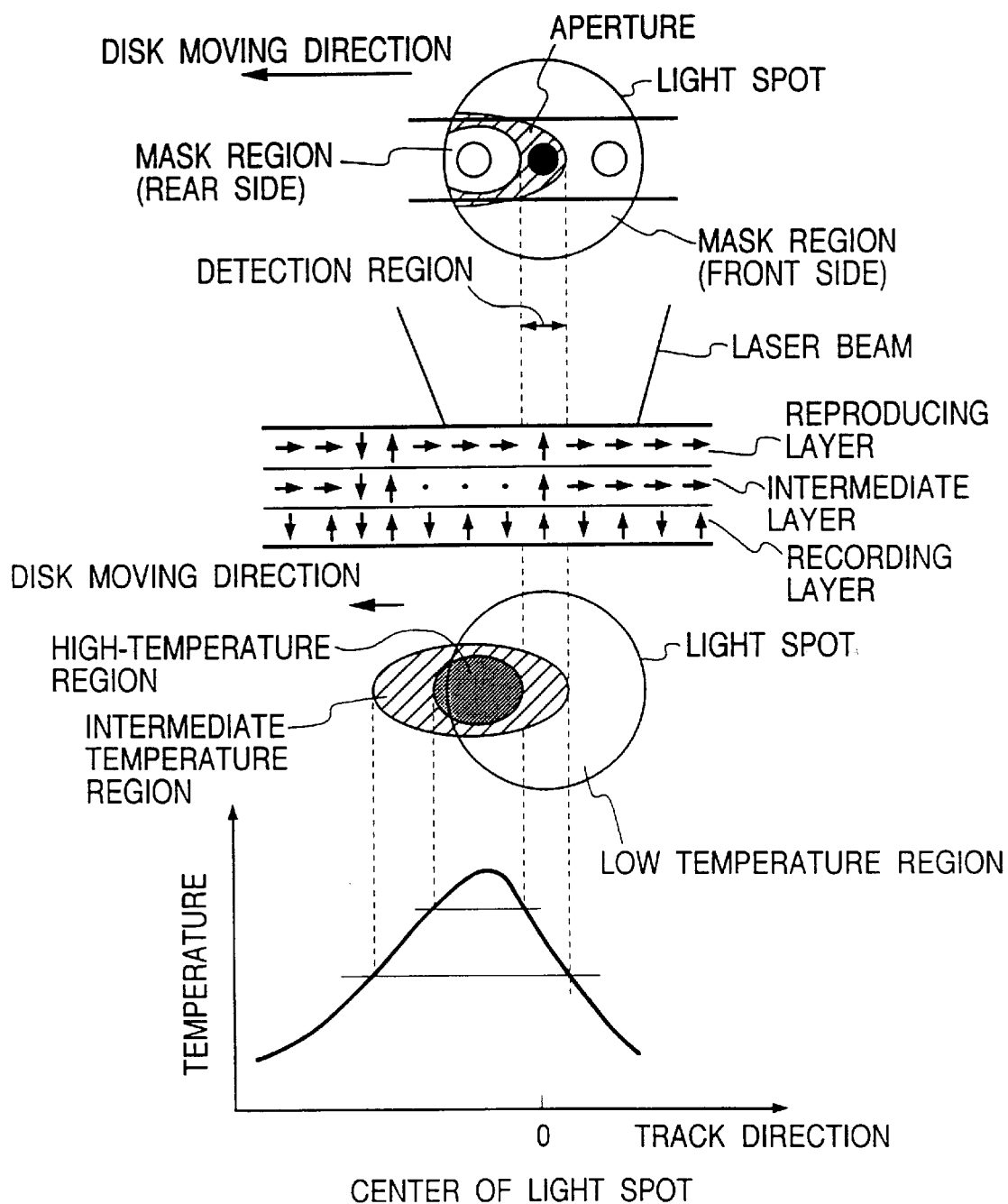
FIG. 17 is an explanatory view showing another example of the information reproducing method in the second embodiment of the present invention.

Therefore, as shown in FIG. 17, a mask region which masks magnetization information on the recording layer, and an aperture region through which the magnetization information is detected are formed in the light spot. Since the aperture region can have an area smaller than that of the light spot, a signal having a period equal to or smaller than the diffraction light of light can be detected. As described above, the front-side mask can have a perfect function.

Since marks on neighboring tracks can also be perfectly masked, the density of tracks can also be increased.

In this case, the intermediate layer preferably consists of a material such as Gd or the like which has a small anisotropy and can easily form an interface magnetic wall, for example, GdFe, GeFeCo, or the like, and a non-magnetic element such as Al, Cu, Cr, or the like is preferably added to such a material so as to decrease the Curie temperature.

The film thickness of the intermediate layer can be equal to or larger than that of a magnetic wall portion formed between the reproducing layer which is an in-plane magnetization film in a temperature range from room temperature to a temperature lower than the reproducing temperature, and the recording layer which is a perpendicular magnetization film. On the other hand, when the film thickness of the intermediate layer is too large, the total thickness of the magnetic layers becomes large, and high recording power is undesirably required. Therefore, the film thickness of the intermediate layer preferably falls within a range from 20 Å to 200 Å and, more preferably, a range from 50 Å to 150 Å.

As the physical properties of the reproducing layer, the intermediate layer, and the recording layer, when the Curie temperatures of the reproducing layer, the intermediate layer, and the recording layer are respectively represented by $Tc_1$, $Tc_3$, and $Tc_2$, the compensation temperature of the reproducing layer is represented by $T_{comp1}$, the saturation magnetizations of the reproducing layer, the intermediate layer, and the recording layer are respectively represented by $Ms_1$, $Ms_3$, and $Ms_2$, the effective perpendicular magnetic anisotropy constants of the reproducing layer, the intermediate layer, and the recording layer are respectively represented by $K\perp_1$, $K\perp_3$, and $K\perp_2$, and the perpendicular magnetic anisotropy energies of the reproducing layer, the intermediate layer, and the recording layer are respectively represented by $Ku_1$, $Ku_3$, and $Ku_2$, assuming:

$$K\perp_i Ku_i - 2\pi Ms_i^2 (i=1, 2, 3) \quad (XI)$$

then, at room temperature, it suffices to satisfy the following relation:

$$K\perp_3 < K\perp_1 << K\perp_2 \quad (XII)$$

As an example which can satisfy the above relation, the following relations must be satisfied at room temperature:

$$Ms_1 < Ms_3 \quad (XIII)$$

$$Ms_2 < Ms_3 \quad (XIV)$$

The above-mentioned Curie temperatures must satisfy:

$$RT \text{ (room temperature)} < Tc_3 << Tc_1 \quad (XV)$$

Figure 18A:
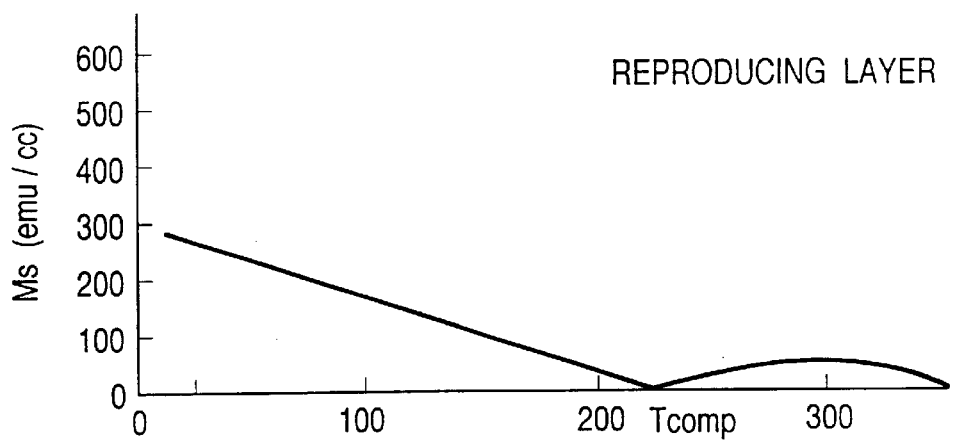
FIGS. 18A, 18B, and 18C are graphs showing the temperature dependence of Ms of the present invention obtained when an intermediate layer is arranged between a reproducing layer and a recording layer.
Figure 18B:
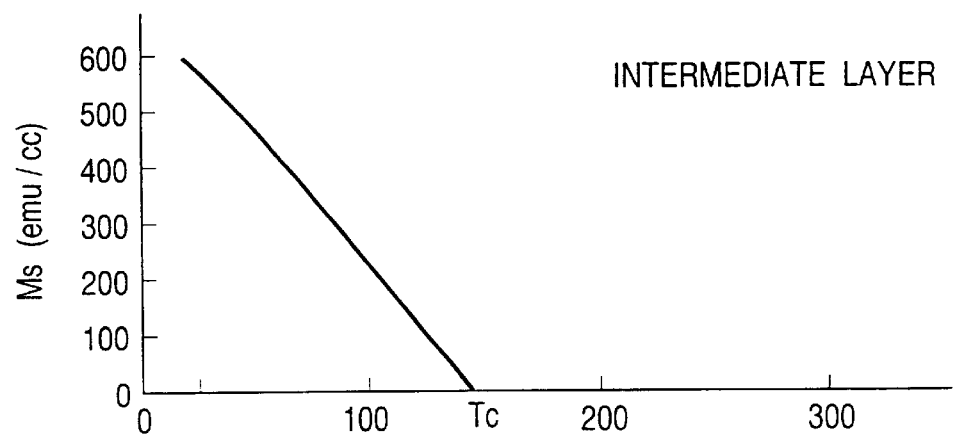
Figure 18C:
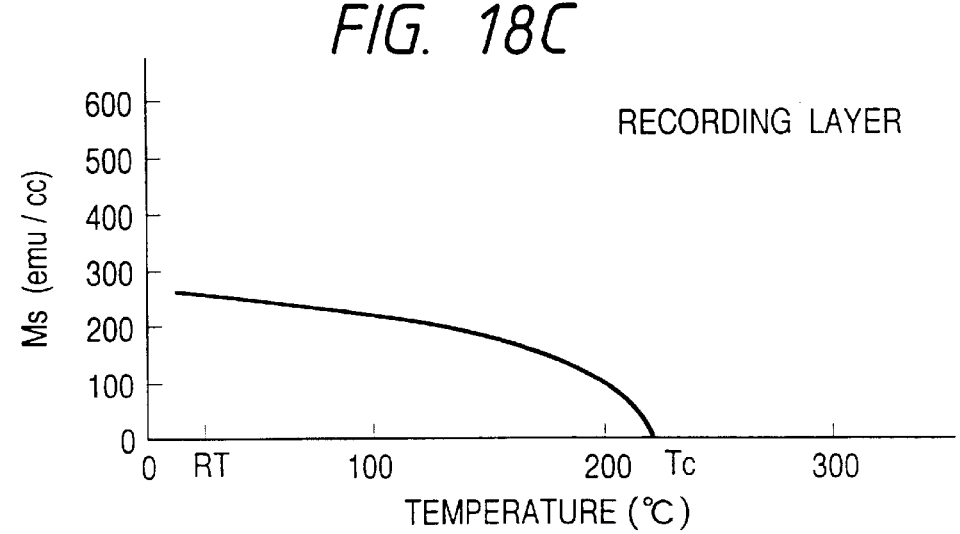

FIGS. 18A to 18C show an example of the temperature dependences of the saturation magnetizations of the reproducing layer, the intermediate layer, and the recording layer, which can satisfy the above-mentioned conditions.

In order to increase the in-plane anisotropy of the intermediate layer, in place of the above-mentioned method of increasing Ms, the perpendicular anisotropy energy Ku may be set to be small or may assume a negative value (to have in-plane anisotropy) by, e.g., adding an element such as Co for improving in-plane anisotropy.

Figure 19:
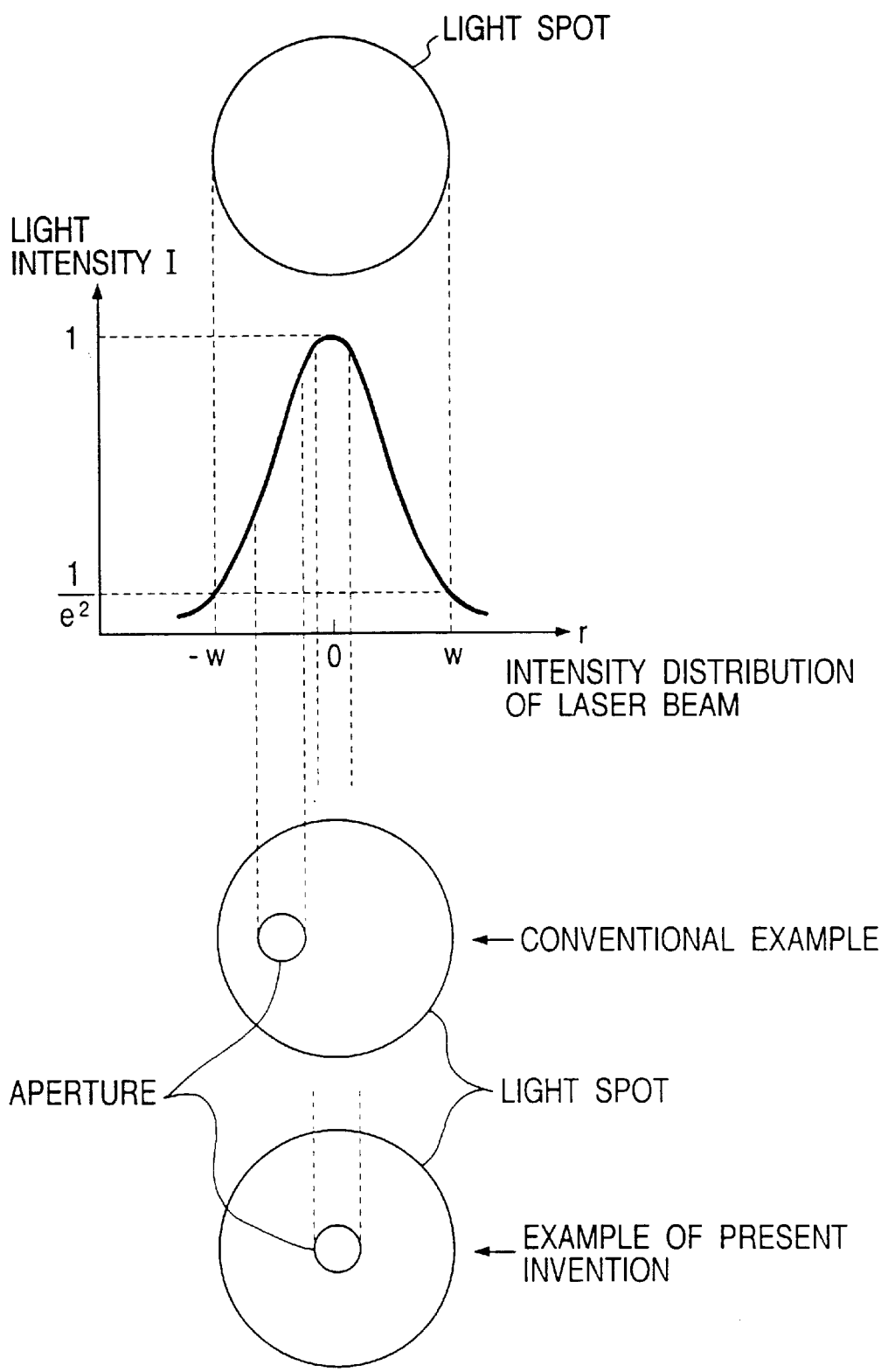
FIG. 19 is a view showing the relationship between the beam intensity of a light spot and the detection region in the spot.

As described above, in the information reproducing method using the magneto-optical recording medium of the present invention, as shown in FIG. 19, since a reproducible region in the light spot becomes a narrow region sandwiched between high- and low-temperature regions, information recorded even at higher density can be satisfactorily reproduced by super-resolution. Furthermore, since the detection region is located at the center of the light spot, a higher C/N ratio can be expected.

Figure 20:
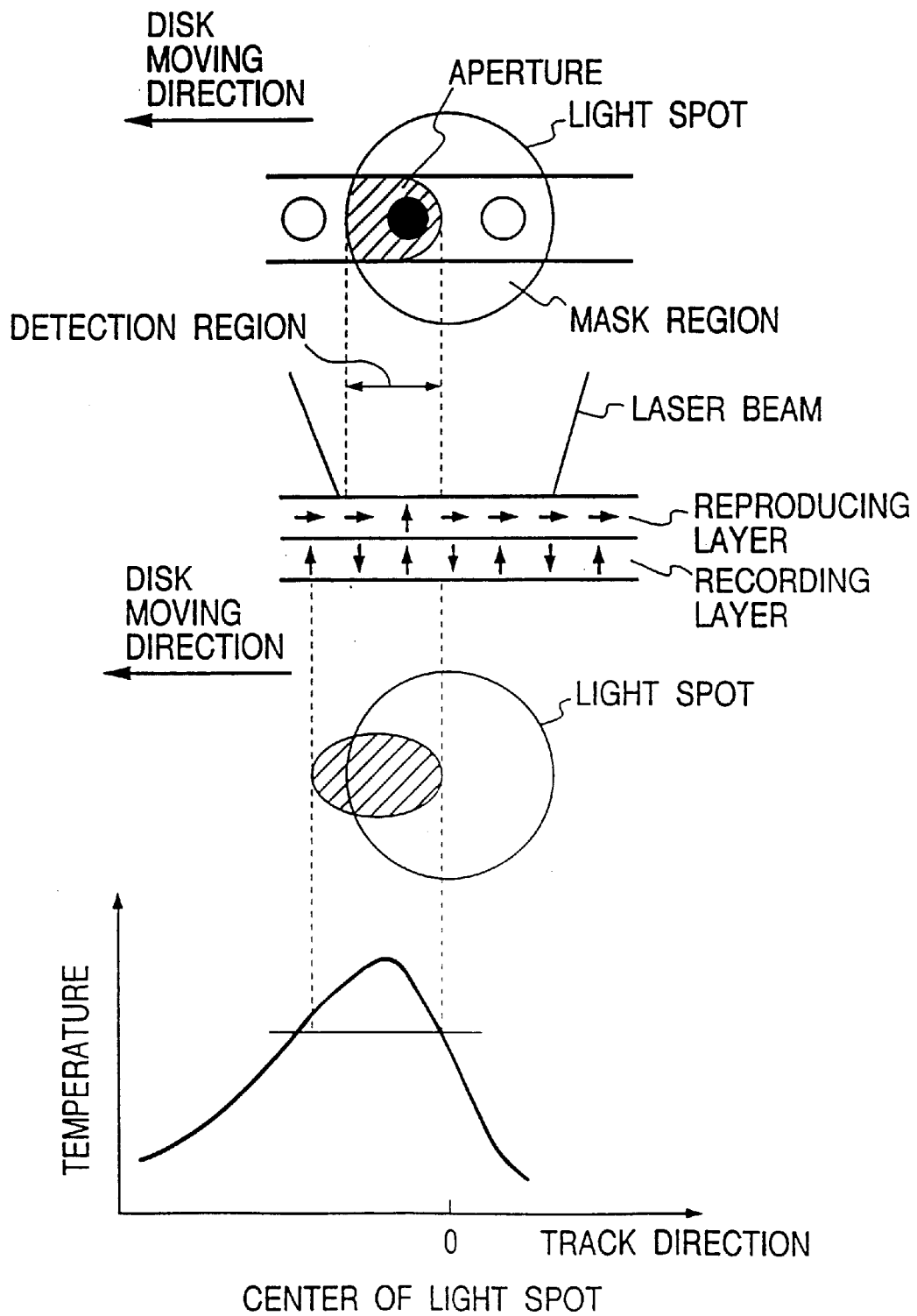
FIG. 20 is an explanatory view showing an information reproducing method of a comparative experimental example.

This is because a high C/N ratio is expected upon reproduction at the central portion of the light spot since the intensity distribution of the laser beam is a Gaussian distribution, and the spot central portion has the highest intensity. (In general, when the medium moves, the center of the light spot does not coincide with the center of the temperature distribution of the medium, and the highest-temperature region is shifted toward the medium moving direction in the light spot. For this reason, when the highest-temperature region is set to be a detection region, the detection region is offset from the central portion of the spot (FIG. 20)).

The medium according to the second embodiment of the present invention will be explained in detail below by way of its experimental examples. However, the present invention is not limited to the following experimental examples if intended modifications fall within the scope of the invention.

EXPERIMENTAL EXAMPLE 5

Using the same film formation apparatus as that in Experimental Example 1, a magneto-optical recording medium having a three-layered structure including an intermediate layer, which had a low Curie temperature, and had a larger in-plane anisotropy than that of the reproducing layer on a low-temperature region in the light spot, was manufactured.

Figure 21A:
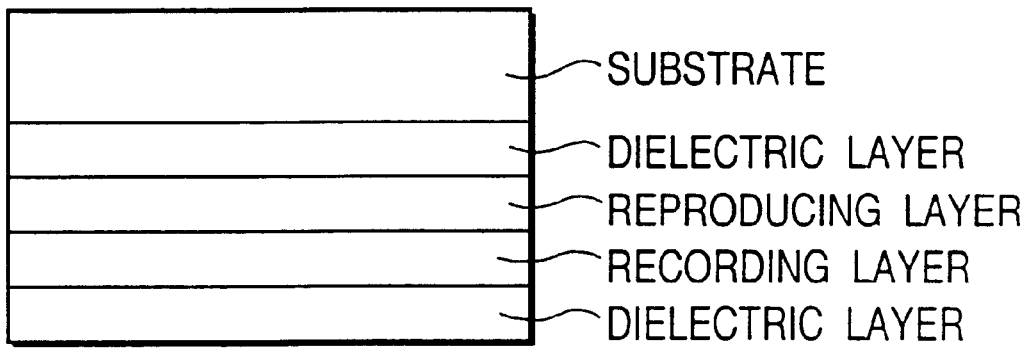
FIGS. 21A and 21B are views showing the film structure of the magneto-optical recording medium according to the second embodiment of the present invention.
Figure 21B:
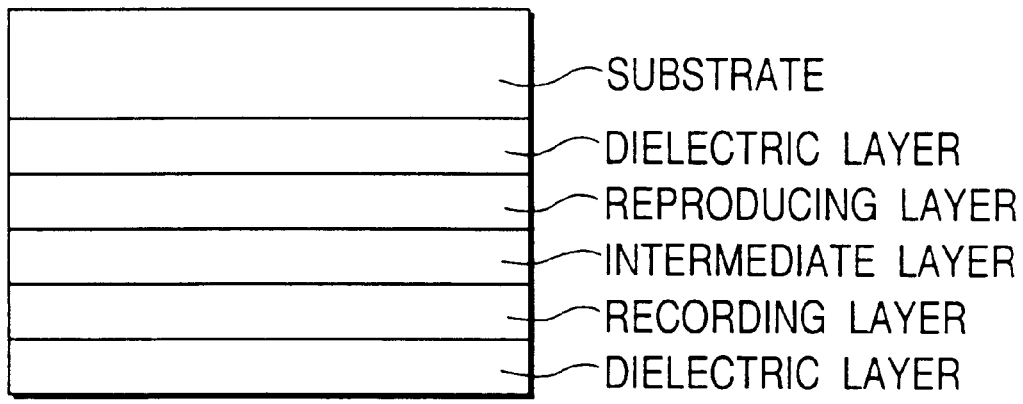

A 900-Å thick SiN dielectric layer, a 400-Å thick GdFeCo reproducing layer, a 100-Å thick GdFe intermediate layer, a 300-Å thick TbFeCo recording layer, and a 700-Å thick SiN protective layer were formed on a glass substrate in the order named to obtain a sample with the arrangement shown in FIG. 21B. Upon formation of each SiN layer, $N_2$ gas was supplied in addition to Ar gas, and the film was formed by DC reactive sputtering. In this case, the mixing ratio of the Ar gas and $N_2$ gas was adjusted to obtain a refractive index of 2.1.

The composition of the GdFeCo reproducing layer was selected to be RE rich at room temperature, and to have a saturation magnetization Ms of 160 emu/cc, a compensation temperature of 205° C., and a Curie temperature of 300° C. or higher.

The composition of the GdFe intermediate layer was selected to be RE rich at room temperature, and to have Ms of 520 emu/cc and a Curie temperature of 150° C.

The composition of the TbFeCo recording layer was selected to be TM rich at room temperature, and to have a saturation magnetization Ms of 200 emu/cc and a Curie temperature of 220° C.

Figure 22:
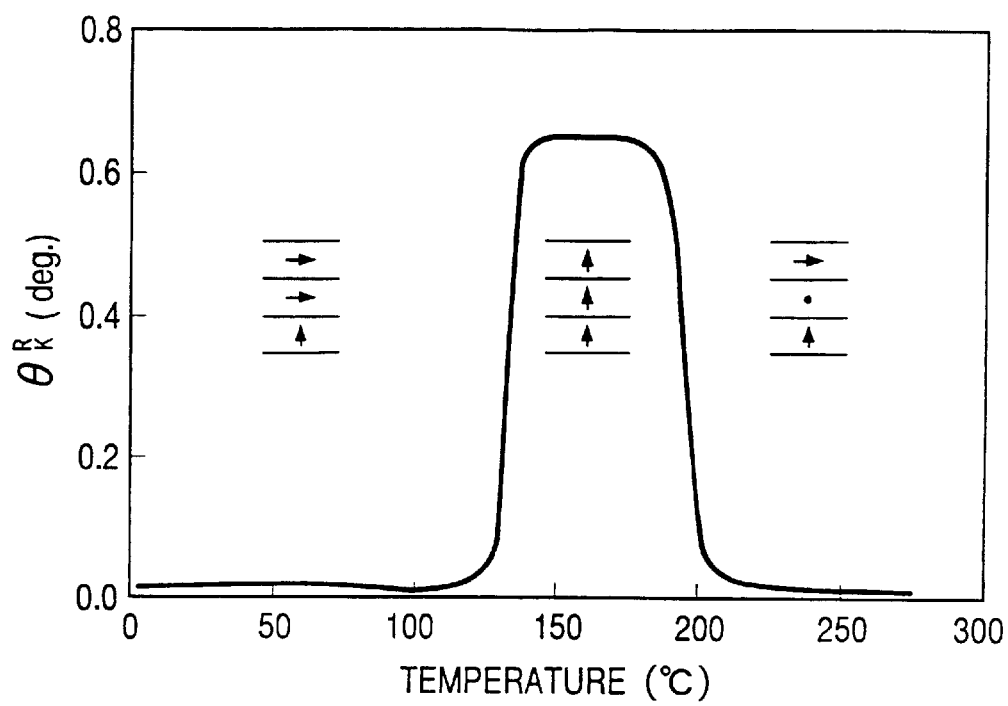
FIG. 22 is a graph showing an example of the temperature dependence of residual $\theta_K$ (when magnetic field=0) of the medium according to the second embodiment of the present invention.

A semiconductor laser beam of 830 nm was irradiated from the glass substrate side onto the sample formed on a glass substrate by the above-mentioned method, and the external magnetic dependence of the Kerr rotation angle ($\theta_K$) was measured. The measurement was performed by heating the sample from room temperature to about 200° C. FIG. 22 shows the temperature dependence of the Kerr rotation angle (residual Kerr rotation angle; $\theta_K^R$) obtained when the external magnetic field was zero. As can be seen from FIG. 22, $\theta_K^R$ is almost zero within a range from room temperature to about 140° C., abruptly increases from a temperature of about 140° C., and then becomes 0 at a temperature of about 200° C.

EXPERIMENTAL EXAMPLE 6

Magneto-optical recording films were formed on a polycarbonate substrate with pregrooves to have the same layer arrangement and film compositions as those in Experimental Example 5, thus manufacturing a magneto-optical recording medium of the present invention.

Using this magneto-optical recording medium, the recording/reproduction characteristics were measured.

In a measurement apparatus, the N.A. of an objective lens was set to be 0.55, and the laser wavelength was set to be 780 nm. By setting the recording power to be 8 mW and the linear velocity to be 9 m/s, carrier signals of 6 to 15 MHz were written stepwise on the recording layer by a magnetic field modulation method while applying a magnetic field of ±200 Oe, and then, the recording mark length dependence of the C/N ratio was checked.

The reproducing power was set to be a value (2.5 to 3.5 mW) which could maximize the C/N ratio.

Table 2 shows the C/N ratios obtained when carrier signals of 15 MHz (mark length=0.30 μm), 11.25 MHz (mark length=0.40 μm), and 9 MHz (mark length=0.50 μm) were recorded.

Also, crosstalk from neighboring tracks was measured. The crosstalk was expressed as a difference between a reproducing signal obtained from a land portion on which a signal with a mark length of 1.6 μm was recorded, and a reproducing signal obtained from a neighboring groove portion. Table 2 shows the measurement results.

EXPERIMENTAL EXAMPLE 7

Using the same apparatus and method as in Experimental Example 1, a 900-Å thick SiN dielectric layer, a 400-Å thick GdFeCo reproducing layer, a 120-Å thick GdFe intermediate layer, a 300-Å TbFeCo recording layer, and a 700-Å thick SiN protective layer were formed on a polycarbonate substrate in the order named to obtain a sample with the arrangement shown in FIG. 21B.

The composition of the GdFeCo reproducing layer was selected to be RE rich at room temperature, and to have a saturation magnetization Ms of 180 emu/cc, a compensation temperature of 220° C., and a Curie temperature of 300° C. or higher.

The composition of the GdFe intermediate layer was selected to be RE rich at room temperature, and to have an Ms of 680 emu/cc and a Curie temperature of 180° C.

The composition of the TbFeCo recording layer was selected to be TM rich at room temperature, and to have a saturation magnetization Ms of 200 emu/cc and a Curie temperature of 220° C.

The recording mark length dependence of the C/N ratio and crosstalk were then examined as in Experimental Example 6. Table 2 shows the examination results.

EXPERIMENTAL EXAMPLE 8

Using the same apparatus and method as in Experimental Example 1, a 900-Å thick SiN dielectric layer, a 400-Å thick GdFeCo reproducing layer, an 80-Å thick GdFe intermediate layer, a 300-Å TbFeCo recording layer, and a 700-Å thick SiN protective layer were formed on a polycarbonate substrate in the order named to obtain a sample with the arrangement shown in FIG. 21B.

The composition of the GdFeCo reproducing layer was selected to be RE rich at room temperature, and to have a saturation magnetization Ms of 150 emu/cc, a compensation temperature of 188° C., and a Curie temperature of 300° C. or higher.

The composition of the GdFe intermediate layer was selected to be RE rich at room temperature, and to have an Ms of 520 emu/cc and a Curie temperature of 170° C.

The composition of the TbFeCo recording layer was selected to be TM rich at room temperature, and to have a saturation magnetization Ms of 200 emu/cc and a Curie temperature of 220° C.

The recording mark length dependence of the C/N ratio and crosstalk were then examined as in Experimental Example 6. Table 2 shows the examination results.

EXPERIMENTAL EXAMPLE 9

Using the same apparatus and method as in Experimental Example 1, a 900-Å thick SiN dielectric layer, a 400-Å thick GdFeCo reproducing layer, a 90-Å thick GdFe intermediate layer, a 300-Å TbFeCo recording layer, and a 700-Å thick SiN protective layer were formed on a polycarbonate substrate in the order named to obtain a sample with the arrangement shown in FIG. 21B.

The composition of the GdFeCo reproducing layer was selected to be RE rich at room temperature, and to have a saturation magnetization Ms of 160 emu/cc, a compensation temperature of 188° C., and a Curie temperature of 300° C. or higher.

The composition of the GdFe intermediate layer was selected to be RE rich at room temperature, and to have an Ms of 470 emu/cc and a Curie temperature of 165° C.

The composition of the TbFeCo recording layer was selected to be TM rich at room temperature, and to have a saturation magnetization Ms of 200 emu/cc and a Curie temperature of 220° C.

The recording mark length dependence of the C/N ratio and crosstalk were then examined as in Experimental Example 6. Table 2 shows the examination results.

COMPARATIVE EXPERIMENTAL EXAMPLE 4

Using the same apparatus and method as in Experimental Example 1, a 900-Å thick SiN dielectric layer, a 400-Å thick GdFeCo reproducing layer, a 300-Å TbFeCo recording layer, and a 700-Å thick SiN protective layer were formed on a polycarbonate substrate in the order named to obtain a sample with the arrangement shown in FIG. 21A.

The composition of the GdFeCo reproducing layer was selected to be RE rich at room temperature, and to have a saturation magnetization Ms of 130 emu/cc, a compensation temperature of 280° C., and a Curie temperature of about 300° C.

The composition of the TbFeCo recording layer was selected to be TM rich at room temperature, and to have a saturation magnetization Ms of 200 emu/cc and a Curie temperature of 220° C.

Figure 23:
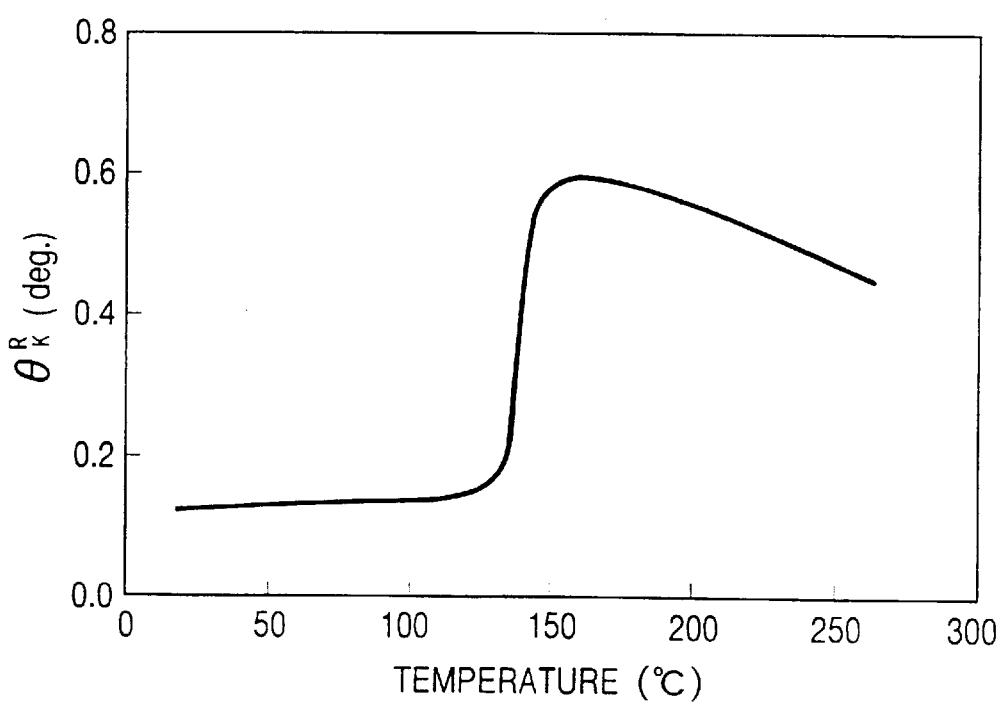
FIG. 23 is a graph showing an example of the temperature dependence of residual $\theta_K$ (when magnetic field=0) of a medium of a comparative experimental example.

This sample had a temperature dependence of the residual $\theta_K{}^R$, as shown in FIG. 23, and did not revert to an in-plane magnetization film again at high temperatures. When a two-layered structure including a reproducing layer and a recording layer is adopted, and the compensation temperature is close to the Curie temperature like in this comparative experimental example, the reproducing layer cannot be an in-plane magnetization film again at high temperatures.

COMPARATIVE EXPERIMENTAL EXAMPLE 5

After the same magneto-optical recording medium as in Comparative Experimental Example 1 was manufactured, the recording mark length dependence of the C/N ratio and crosstalk were then examined as in Experimental Example 6. Table 2 shows the examination results.

COMPARATIVE EXPERIMENTAL EXAMPLE 6

Using the same apparatus and method as in Experimental Example 1, a 900-Å thick SiN dielectric layer, a 400-Å thick GdFeCo reproducing layer, a 300-Å TbFeCo recording layer, and a 700-Å thick SiN protective layer were formed on a polycarbonate substrate in the order named to obtain a magneto-optical recording medium of the present invention with the arrangement shown in FIG. 21A. Each SiN layer had a refractive index of 2.1.

The composition of the GdFeCo reproducing layer was selected to be RE rich at room temperature, and to have a saturation magnetization Ms of 180 emu/cc, a compensation temperature of 290° C., and a Curie temperature of about 300° C.

The composition of the TbFeCo recording layer was selected to be TM rich at room temperature, and to have a saturation magnetization Ms of 200 emu/cc and a Curie temperature of 220° C.

The recording mark length dependence of the C/N ratio and crosstalk were then examined as in Experimental Example 6. Table 2 shows the examination results.

As can be seen from a comparison between Experimental Examples 5 to 9 and Comparative Experimental Examples 4 to 6, the C/N ratio and crosstalk at a short mark length are remarkably improved according to the present invention.

TABLE 2

| | Reproducing Layer | | | | | Intermediate Layer | | | |
|---|---|---|---|---|---|---|---|---|---|
| | Composition | Film Thickness Å | Ms emu/cc | $T_{comp}$ ° C. | Tc ° C. | Composition | Film Thickness Å | Ms emu/cc | Tc ° C. |
| Experimental Examples 5 & 6 | $Gd_{28}(Fe_{60}Co_{40})_{72}$ | 400 | 180 | 205 | 300< | $Gd_{45}Fe_{55}$ | 100 | 520 | 150 |
| Experimental Example 7 | $Gd_{29}(Fe_{60}Co_{40})_{71}$ | 400 | 200 | 220 | 300< | $Gd_{45}(Fe_{90}Co_{10})_{50}Al_5$ | 120 | 680 | 180 |
| Experimental Example 8 | $Gd_{27}(Fe_{68}Co_{32})_{73}$ | 400 | 150 | 188 | 300< | $Gd_{45}(Fe_{98}Co_2)_{55}$ | 80 | 520 | 170 |
| Experimental Example 9 | $Gd_{27}(Fe_{65}Co_{35})_{73}$ | 400 | 160 | 188 | 300< | $Gd_{40}(Fe_{94}Co_6)_{60}$ | 90 | 470 | 165 |
| Comparative Experimental Examples 4 & 5 | $Gd_{27}(Fe_{65}Co_{35})_{73}$ | 400 | 130 | 280 | 300< | — | — | — | — |
| Comparative Experimental Example 6 | $Gd_{32}(Fe_{60}Co_{40})_{68}$ | 400 | 270 | 280 | 300< | — | — | — | — |

| | Recording Layer | | | | C/N (dB) | | | |
|---|---|---|---|---|---|---|---|---|
| | Composition | Film Thickness Å | Ms emu/cc | Tc ° C. | 0.30 μm | 0.40 μm | 0.50 μm | Crosstalk |
| | | | | | dB | | | dB |
| Experimental Examples 5 & 6 | $Tb_{20}(Fe_{80}Co_{20})_{80}$ | 300 | −200 | 220 | 41 | 45 | 48 | −40 |
| Experimental Example 7 | $Tb_{20}(Fe_{80}Co_{20})_{80}$ | 300 | −200 | 220 | 39 | 44 | 48 | −41 |
| Experimental Example 8 | $Tb_{20}(Fe_{80}Co_{20})_{80}$ | 300 | −200 | 220 | 40 | 45 | 48 | −40 |
| Experimental Example 9 | $Tb_{20}(Fe_{80}Co_{20})_{80}$ | 300 | −200 | 220 | 40 | 44 | 48 | −41 |
| Comparative Experimental Examples 4 & 5 | $Tb_{20}(Fe_{80}Co_{20})_{80}$ | 300 | −200 | 220 | 20 | 26 | 46 | −20 |
| Comparative Experimental Example 6 | $Tb_{20}(Fe_{80}Co_{20})_{80}$ | 300 | −200 | 220 | 26 | 29 | 47 | −21 |

What is claimed is:

1. An information reproducing method for reproducing information recorded on a recording layer of a magneto-optical recording medium, wherein said magnetooptical recording medium includes a transparent substrate, a reproducing layer on said transparent substrate said reproducing layer having in-plane magnetization at room temperature, and having perpendicular magnetization at a temperature between room temperature and the Curie temperature thereof; a recording layer having perpendicular magnetization in a temperature range from room temperature to the Curie temperature thereof; an intermediate layer which is between said reproducing layer and said recording layer has a larger in-plane magnetic anistropy that the in-plane magnetic anistropy of said reproducing layer at room temperature wherein the Curie temperatures of said respective layers are higher than room temperature, and said reproducing layer, said intermediate layer, and said recording layer are laminated on the substrate in this order and wherein the Curie temperature of said intermediate layer is lower than the Curie temperatures of said recording layer and said reproducing layer;

said information reproducing method comprising the steps of:
(a) irradiating a light beam spot from the reproducing layer side;
(b) converting a magnetization in a partial region, in the light beam spot irradiated region, on said reproducing layer into a perpendicular magnetization;
(c) transferring information recorded on said recording layer to the partial region, which has a perpendicular magnetization of said reproducing layer by magnetic coupling; and
(d) reproducing the information by detecting light reflected by said medium.

2. A method according to claim 1, wherein said reproducing layer has in-plane magnetization at a temperature higher than the Curie temperature of said intermediate layer.

3. A method according to claim 1, wherein each of said reproducing layer, recording layer, and intermediate layer consists of a rare earth-transition metal amorphous alloy.

4. A medium according to claim 2, wherein a saturation magnetization, at room temperature, of said intermediate layer is larger than the saturation magnetization, at room temperature, of said reproducing layer.

* * * * *